US012450792B2

United States Patent
Ye

(10) Patent No.: US 12,450,792 B2
(45) Date of Patent: Oct. 21, 2025

(54) SYSTEMS AND METHODS FOR MRI DATA PROCESSING

(71) Applicant: SHANGHAI UNITED IMAGING HEALTHCARE CO., LTD., Shanghai (CN)

(72) Inventor: Yongquan Ye, Houston, TX (US)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 751 days.

(21) Appl. No.: 17/656,875

(22) Filed: Mar. 28, 2022

(65) Prior Publication Data

US 2023/0306656 A1 Sep. 28, 2023

(51) Int. Cl.
 G06T 11/00 (2006.01)
 G06T 5/50 (2006.01)
 G06T 7/00 (2017.01)

(52) U.S. Cl.
 CPC ........... G06T 11/003 (2013.01); G06T 5/50 (2013.01); G06T 7/0014 (2013.01); *G06T 2207/10088* (2013.01)

(58) Field of Classification Search
 CPC ....... G06T 11/003; G06T 5/50; G06T 7/0014; G06T 2207/10088
 See application file for complete search history.

(56) References Cited

U.S. PATENT DOCUMENTS

| 12,079,960 B2 * | 9/2024 | Clark et al. | G06T 5/50 |
| 2019/0302211 A1 * | 10/2019 | Cai et al. | G01R 33/565 |
| 2020/0202586 A1 * | 6/2020 | Li et al. | G06T 11/00 |

FOREIGN PATENT DOCUMENTS

| CN | 105631897 B | | 6/2016 | |
| CN | 114076911 A | * | 2/2022 | ........ G01R 33/4831 |
| JP | 2009195584 A | * | 9/2009 | ............ A61B 5/055 |
| JP | WO2010107041 A1 | * | 9/2010 | ........... G01R 33/246 |
| JP | 6367056 B2 | * | 8/2018 | ............ A61B 5/055 |

OTHER PUBLICATIONS

M. Bydder et al., Combination of Signals from Array Coils Using Image-based Estimation of Coil Sensitivity Profiles, Magnetic Resonance in Medicine, 47(3): 539-548, 2002.

(Continued)

*Primary Examiner* — Vu Le
*Assistant Examiner* — Matthew James Bodnark
(74) *Attorney, Agent, or Firm* — METIS IP LLC

(57) ABSTRACT

A system and method for MRI data processing are provided. A plurality of sets of image data of a subject acquired by a magnetic resonance (MR) scanner and a set of reference image data of the subject may be obtained. For each set of the plurality of sets of image data, a phase shift between the set of reference image data and the set of image data may be determined using a cross-correlation algorithm, and a set of corrected image data of the channel may be obtained by performing a phase correction for the set of image data based on the phase shift. Target image data of the subject may be determined based on the plurality of sets of corrected image data of the subject. A target image of the subject may be generated by image reconstruction based on the target image data of the subject.

18 Claims, 6 Drawing Sheets

(56) References Cited

OTHER PUBLICATIONS

David O. Walsh et al., Adaptive Reconstruction of Phased Array MR Imagery, Magnetic Resonance in Medicine, 43 (5): 682-690, 2000.
E. Mark Haacke et al., Susceptibility Weighted Imaging (SWI), Magnetic Resonance in Medicine, 52(3): 612-618, 2004.
Kathryn E. Hammond et al., Development of a Robust Method for Generating 7T Multichannel Phase Images of the Brain with Application to Normal Volunteers and Patients with Neurological Diseases, Neuroimage, 2008, 21 pages.
Dennis L. Parker et al., Phase Reconstruction from Multiple Coll Data Using a Virtual Reference Coil, Magnetic Resonance in Medicine, 72(2): 563-569, 2014.
Simon Daniel Robinson et al., Combining Phase Images from Array Coils Using a Short Echo Time Reference Scan (COMPOSER), Magnetic Resonance in Medicine, 77(1): 318-327, 2017.
Olivia W. Stanley et al., Receiver Phase Alignment Using Fitted SVD Derived Sensitivities from Routine Prescans, Plos One, 16(8): 1-20, 2021.
P. B. Roemer et al., The NMR Phased Array, Magnetic Resonance in Medicine, 16(2): 192-225, 1990.
Rüdiger Stirnberg et al., Phase Laplacian Coil Combination, Magnetic Resonance in Medicine, 2018, 3 pages.
Viktor Vegh et al., Selective Channel Combination of MRI Signal Phase, Magnetic Resonance in Medicine, 76(5): 1469-1477, 2016.
Shaeez Usman Abdulla et al., MRI Phase Offset Correction Method Impacts Quantitative Susceptibility Mapping, Magnetic Resonance Imaging, 74: 139-151, 2020.
B. Strasser et al., Coil combination of multichannel MRSI data at 7 T: Musical, NMR in Biomedicine 26(12):1796-1805, 2013.

\* cited by examiner

SYSTEMS AND METHODS FOR MRI DATA PROCESSING

TECHNICAL FIELD

The present disclosure relates to magnetic resonance imaging (MRI) technology, and in particular, to systems and methods for MRI data processing.

BACKGROUND

With the development of MRI technology, a coil array including multiple radiofrequency (RF) receiver coil units is widely used in MR scanning. Each of the multiple RF receiver coil units can receive MR signals from a same subject to generate a set of image data. Multiple sets of image data corresponding to the multiple RF receiver coil units can be combined to generate a set of combined image data. An image of the subject may be reconstructed based on the set of combined image data. Accuracy of the set of combined image data may affect the quality of an image of the subject determined based thereon by way of image reconstruction. Thus, it is desired to provide systems and methods for MRI data processing with high efficiency and accuracy.

SUMMARY

According to an aspect of the present disclosure, a system for MRI data processing may be provided. The system may include at least one storage device and at least one processor configured to communicate with the at least one storage device. The at least one storage device may include a set of instructions. When the at least one processor executes the set of instructions, the at least one processor may be directed to cause the system to perform one or more of the following operations. The system may obtain a plurality of sets of image data of a subject acquired by a magnetic resonance (MR) scanner. Each set of the plurality of sets of image data may be acquired from a channel corresponding to a coil unit of a coil array of the MR scanner. The system may also obtain a set of reference image data of the subject. For each set of the plurality of sets of image data, the system may determine a phase shift between the set of reference image data and the set of image data using a cross-correlation algorithm, and obtain a set of corrected image data of the channel by performing a phase correction for the set of image data based on the phase shift. The system may also determine target image data of the subject based on the plurality of sets of corrected image data of the subject. The system may further reconstruct a target image of the subject based on the target image data of the subject.

In some embodiments, the set of reference image data and the plurality of sets of image data of the subject may include image data in an image domain, image data in a k-space domain, or image data in an image and k-space hybrid domain.

In some embodiments, to obtain a set of reference image data of the subject, the system may determine the set of reference image data of the subject based on the plurality of sets of image data.

In some embodiments, to determine the set of reference image data of the subject based on the plurality of sets of image data, the system may designate a set of image data with a maximum signal strength from the plurality of sets of image data as the set of reference image data of the subject.

In some embodiments, to determine the set of reference image data of the subject based on the plurality of sets of image data, for each set of the plurality of sets of image data, the system may obtain a degree of correlation between the set of image data and each set of the remaining sets of the plurality of sets of image data using the cross-correlation algorithm. The system may further determine the set of reference image data of the subject based on the degrees of correlation.

In some embodiments, to determine the set of reference image data of the subject based on the degrees of correlation, the system may identify a maximum degree of correlation among the degrees of correlation. The system may identify a first set of image data and a second set of image data corresponding to the maximum degree of correlation. A signal strength of the first set of image data may be greater than a signal strength of the second set of image data. The system may designate the first set of image data as the set of reference image data of the subject.

In some embodiments, to determine the set of reference image data of the subject based on the plurality of sets of image data, the system may obtain a set of initial reference image data of the subject. For each set of at least one set of the plurality of sets of image data, the system may determine a phase shift between the set of initial reference image data and the set of image data using the cross-correlation algorithm. For each set of the plurality of sets of second image data, the system may obtain a set of corrected initial image data by performing a phase correction for the set of image data based on the phase shift between the set of initial reference image data and the set of image data. The system may determine the set of reference image data of the subject based on the at least one set of corrected initial image data.

In some embodiments, the at least one processor may be further directed to cause the system to perform one or more of the following operations. For each set of at least some of the plurality of sets of image data, the system may determine a set of current combined image data of the subject by combining the set of corrected image data and a set of prior reference image data determined previously. The system may further designate the set of current combined image data of the subject as the set of reference image data.

In some embodiments, to obtain a set of reference image data of the subject, the system may obtain a second set of image data of the subject acquired by a second coil unit of the MR scanner. The system may designate the second set of image data as the set of reference image data of the subject.

In some embodiments, to obtain a set of reference image data of the subject, the system may obtain a plurality of second sets of image data of the subject acquired by a second coil array of the MR scanner. Each set of the plurality of second sets of image data may be acquired from a second channel corresponding to a second coil unit of the second coil array. The system may determine the set of reference image data of the subject based on the plurality of second sets of image data.

In some embodiments, to determine the set of reference image data of the subject based on the plurality of second sets of image data, the system may obtain a set of initial reference image data of the subject. For each set of the plurality of second sets of image data, the system may determine a phase shift between the set of initial reference image data and the second set of image data using the cross-correlation algorithm. For each set of the plurality of sets of second image data, the system may obtain a second set of corrected image data of the second channel by performing a phase correction for the second set of image data based on the phase shift between the set of initial reference image data and the second set of image data. The system may further determine the reference image data of the subject based on the plurality of second sets of corrected image data.

In some embodiments, to determine the set of reference image data of the subject based on the plurality of second sets of image data, the system may designate a second set of image data with a maximum signal strength from the plurality of second sets of image data as the set of reference image data of the subject.

In some embodiments, to determine the set of reference image data of the subject based on the plurality of second sets of image data, for each second set of the plurality of second sets of image data, the system may obtain a degree of correlation between the second set of image data and each second set of the remaining second sets of the plurality of second sets of image data using the cross-correlation algorithm. The system may further determine the set of reference image data of the subject based on the degrees of correlation.

In some embodiments, to determine the set of reference image data of the subject based on the degrees of correlation, the system may identify a maximum degree of correlation among the degrees of correlation. The system may also identify two second sets of image data corresponding to the maximum degree of correlation. The system may further designate one second set of the two second sets of image data with a greater signal strength as the set of reference image data of the subject.

In some embodiments, to obtain a set of reference image data of the subject, the system may obtain a plurality of sets of second image data of the subject acquired by the coil array of the MR scanner. Each set of the plurality of sets of second image data may be acquired from a channel corresponding to a coil unit of the coil array. The system may further determine the set of reference image data of the subject based on the plurality of sets of second image data.

In some embodiments, to determine the set of reference image data of the subject based on the plurality of sets of second image data, the system may obtain a set of initial reference image data of the subject. For each set of the plurality of sets of second image data, the system may determine a phase shift between the initial reference image data and the set of second image data using the cross-correlation algorithm. For each set of the plurality of sets of second image data, the system may also obtain a set of corrected second image data of the channel by performing a phase correction for the set of second image data based on the phase shift between the initial reference image data and the set of second image data. The system may further determine the reference image data of the subject based on the plurality of sets of corrected second image data.

In some embodiments, to determine the set of reference image data of the subject based on the plurality of sets of second image data, the system may designate a set of second image data with a maximum signal strength from the plurality of sets of second image data as the set of reference image data of the subject.

In some embodiments, to determine the set of reference image data of the subject based on the plurality of sets of second image data, for each set of the plurality of sets of second image data, the system may obtain a degree of correlation between the set of second image data and each set of the remaining sets of the plurality of sets of second image data using the cross-correlation algorithm. The system may determine the set of reference image data of the subject based on the degrees of correlation.

In some embodiments, to determine the set of reference image data of the subject based on the degrees of correlation, the system may identify a maximum degree of correlation among the degrees of correlation. The system may identify a first set of second image data and a second set of second image data corresponding to the maximum degree of correlation. A signal strength of the first set of second image data may be greater than a signal strength of the second set of second image data. The system may designate the first set of image data as the set of reference image data of the subject.

In some embodiments, to determine a phase shift between the set of reference image data and the set of image data using a cross-correlation algorithm, the system may determine a cross-correlation coefficient between the set of reference image data and the set of image data using the cross-correlation algorithm. The system may determine the phase shift between the set of reference image data and the set of image data based on the cross-correlation coefficient.

In some embodiments, an element value of each element of the set of reference image data and of the set of image data may be represented by a complex number including phase information and amplitude information. To determine a cross-correlation coefficient between the set of reference image data and the set of image data using the cross-correlation algorithm, the system may determine a first average of element values of the set of reference image data and a second average of element values of the set of image data. The system may also determine a zero-normalized cross-correlation (ZNCC) using the cross-correlation algorithm based on the element values of the set of reference image data, the element values of the set of image data, the first average, and the second average. The system may further designate the ZNCC as the cross-correlation coefficient between the set of reference image data and the set of image data. The cross-correlation coefficient may be in a form of a complex number including phase information and amplitude information.

In some embodiments, to determine the phase shift between the set of reference image data and the set of image data based on the cross-correlation coefficient, the system may designate a value of the cross-correlation coefficient divided by a magnitude of the cross-correlation coefficient as the phase shift between the set of reference image data and the set of image data.

In some embodiments, the set of reference image data and the plurality of sets of image data of the subject may be image data in a k-space domain. To determine a phase shift between the set of reference image data and the set of image data using a cross-correlation algorithm, the system may obtain at least a portion of the set of image data. The system may also obtain at least a portion of the set of reference image data corresponding to the at least a portion of the set of image data. The system may also determine a reference phase shift between the at least a portion of the set of image data and the at least corresponding portion of the set of reference image data using the cross-correlation algorithm. The system may designate the reference phase shift as the phase shift between the set of reference image data and the set of image data.

In some embodiments, to determine target image data of the subject based on the plurality of sets of corrected image data of the subject, the system may determine a sum of at least some sets of the plurality of sets of corrected image data of the subject as the target image data of the subject.

In some embodiments, the target image of the subject may include a target phase image or a target amplitude image of the subject.

In some embodiments, the at least one processor may be further directed to cause the system to perform one or more of the following operations. The system may obtain a plurality of sets of third image data of the subject acquired by the coil array of the MR scanner. Each set of the plurality of sets of third image data may be acquired from a channel corresponding to a coil unit of the coil array. For each set of the plurality of sets of third image data, the system may designate a phase shift of a set of image data from a same channel as the set of third image data as a phase shift of the set of third image data. For each set of the plurality of sets of third image data, the system may obtain a set of corrected third image data of the channel by performing a phase correction for the set of third image data based on the phase shift of the set of third image data. The system may determine second target image data of the subject based on the plurality of sets of corrected third image data of the subject. The system may reconstruct a second target image of the subject based on the second target image data of the subject.

In some embodiments, the plurality of sets of image data of the subject may correspond to a first echo, and the at least one processor may be further directed to cause the system to perform the following operations. The system may obtain a plurality of sets of fourth image data of the subject corresponding to a second echo acquired by the coil array of the MR scanner. The plurality of sets of image data and the plurality of sets of fourth image data may be acquired in a same scan. For each set of the plurality of sets of fourth image data, the system may designate a phase shift of a set of image data from a same channel as the set of fourth image data as a phase shift of the set of fourth image data. For each set of the plurality of sets of fourth image data, the system may obtain a set of corrected fourth image data of the channel by performing a phase correction for the set of fourth image data based on the phase shift of the set of fourth image data. The system may also determine third target image data of the subject based on the plurality of sets of corrected fourth image data of the subject. The system may further reconstruct a third target image of the subject corresponding to the second echo based on the third target image data of the subject.

According to another aspect of the present disclosure, a method for MRI data processing may be provided. The method may include obtaining a plurality of sets of image data of a subject acquired by a magnetic resonance (MR) scanner. Each set of the plurality of sets of image data may be acquired from a channel corresponding to a coil unit of a coil array of the MR scanner. The method may also include obtaining a set of reference image data of the subject. The method may also include, for each set of the plurality of sets of image data, determining a phase shift between the set of reference image data and the set of image data using a cross-correlation algorithm. The method may further include, for each set of the plurality of sets of image data, obtaining a set of corrected image data of the channel by performing a phase correction for the set of image data based on the phase shift. The method may include determining target image data of the subject based on the plurality of sets of corrected image data of the subject. The method may further include reconstructing a target image of the subject based on the target image data of the subject.

According to yet another aspect of the present disclosure, a non-transitory computer readable medium may be provided. The non-transitory computer readable may include at least one set of instructions. When executed by at least one processor of a computing device, the at least one set of instructions may cause the computing device to perform a method. The method may include obtaining a plurality of sets of image data of a subject acquired by a magnetic resonance (MR) scanner. Each set of the plurality of sets of image data may be acquired from a channel corresponding to a coil unit of a coil array of the MR scanner. The method may also include obtaining a set of reference image data of the subject. The method may also include, for each set of the plurality of sets of image data, determining a phase shift between the set of reference image data and the set of image data using a cross-correlation algorithm. The method may further include, for each set of the plurality of sets of image data, obtaining a set of corrected image data of the channel by performing a phase correction for the set of image data based on the phase shift. The method may include determining target image data of the subject based on the plurality of sets of corrected image data of the subject. The method may further include reconstructing a target image of the subject based on the target image data of the subject.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, sections or assembly of different levels in ascending order. However, the terms may be displaced by another expression if they achieve the same purpose.

Figure 2:
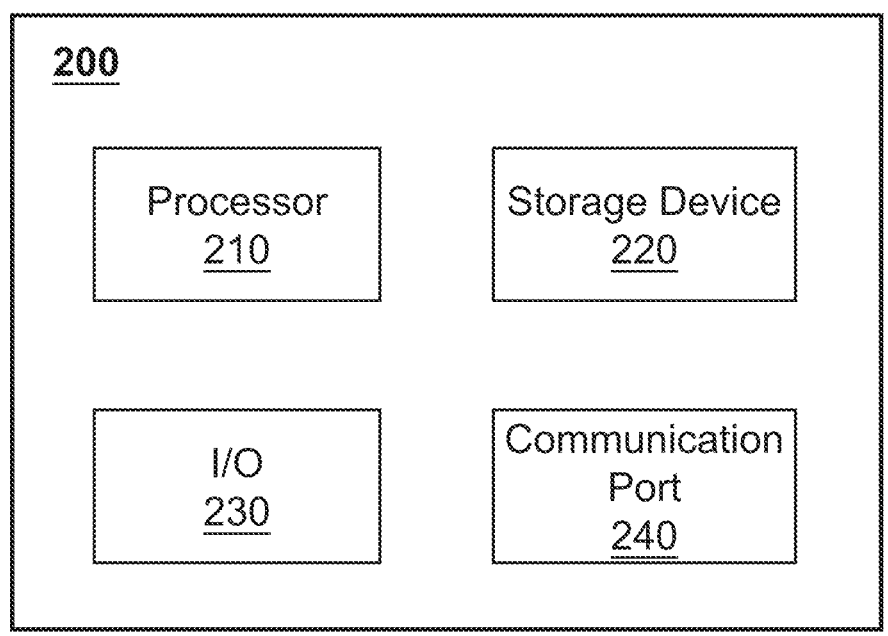
FIG. 2 is a schematic diagram illustrating hardware and/or software components of an exemplary computing device on which the processing device 120 may be implemented according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module, or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items. The term "pixel" and "voxel" in the present disclosure are used interchangeably to refer to an element of an image. An anatomical structure shown in an image of a subject may correspond to an actual anatomical structure existing in or on the subject's body.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

An aspect of the present disclosure relates to systems and methods for MRI data processing. The systems may obtain a plurality of sets of image data of a subject acquired using a magnetic resonance (MR) scanner. The systems may also obtain a set of reference image data of the subject. Each set of the plurality of sets of image data may be acquired from a channel corresponding to a coil unit of a coil array of the MR scanner. For each set of the plurality of sets of image data, the systems may determine a phase shift between the set of reference image data and the set of image data using a cross-correlation algorithm. The systems may also obtain a set of corrected image data of the channel by performing a phase correction for the set of image data based on the phase shift. The systems may also determine target image data of the subject based on the plurality of sets of corrected image data of the subject. The systems may further reconstruct a target image of the subject based on the target image data of the subject. The target image of the subject may include a target phase image and/or a target amplitude image of the subject. The phase shifts obtained according to the methods and systems of the present disclosure may be relatively accurate and/or robust, thereby improving the accuracy of the target image data obtained by phase correction based on the phase shifts. The target image reconstructed based on the phase corrected target image data may be of high quality (e.g., with a high signal-to-noise ratio (SNR) and/or few or no phase singularity artifacts), which is beneficial for, e.g., disease diagnosis.

In some embodiments, the reference image data may be determined by combining multiple sets of processed image data to further improve the accuracy of the obtained target image data and the quality of the target image.

Figure 1:
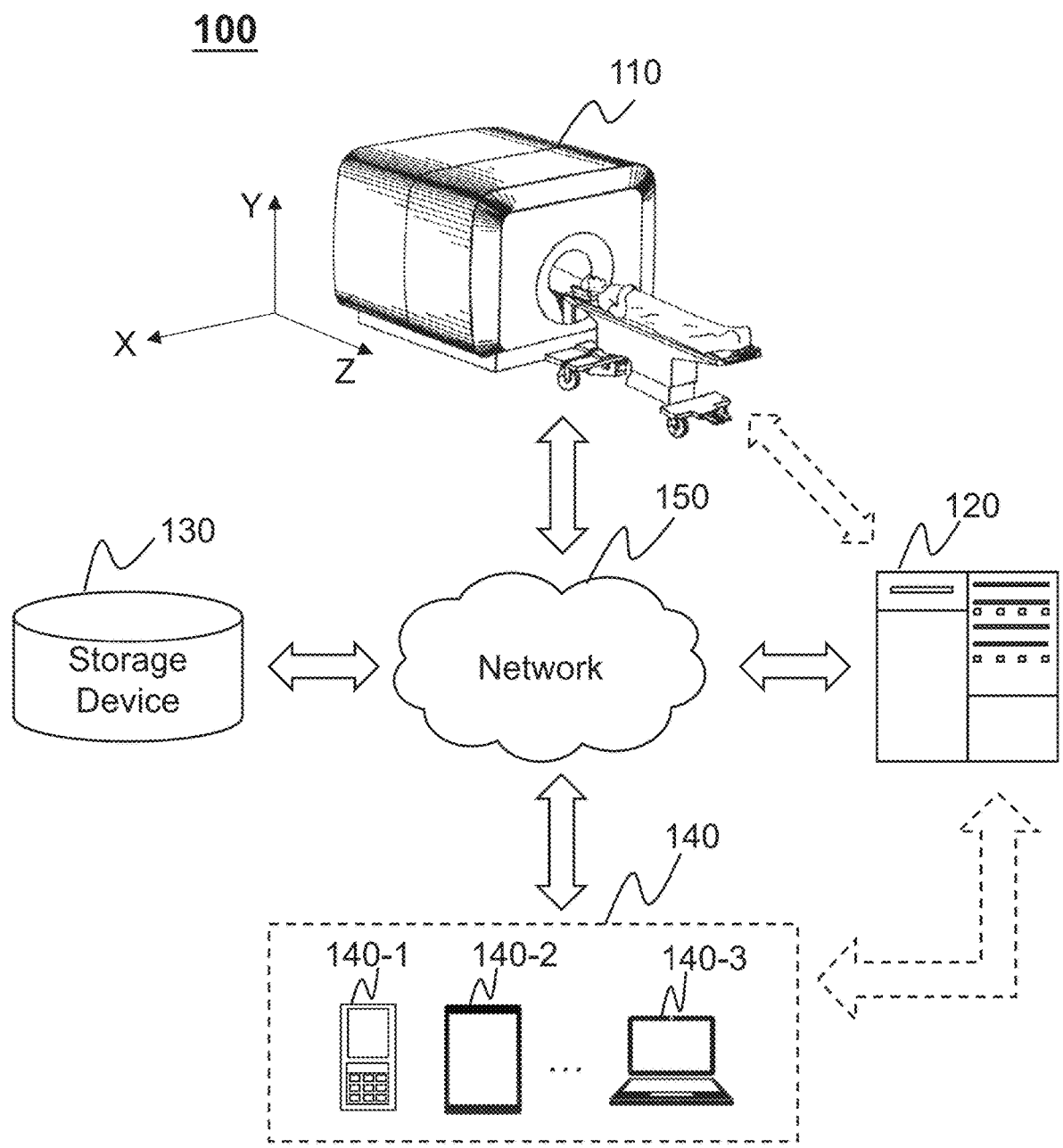
FIG. 1 is a schematic diagram illustrating an exemplary magnetic resonance imaging (MRI) system according to some embodiments of the present disclosure.

FIG. 1 is a schematic diagram illustrating an exemplary magnetic resonance imaging (MRI) system 100 according to some embodiments of the present disclosure. As illustrated, the MRI system 100 may include an MR scanner 110, a processing device 120, a storage device 130, one or more terminals 140, and a network 150. The components in the MRI system 100 may be connected in one or more of various ways. Merely by way of example, as illustrated in FIG. 1, the MR scanner 110 may be connected to the processing device 120 through the network 150. As another example, the MR scanner 110 may be connected with the processing device 120 directly as indicated by the bi-directional arrow in dotted lines linking the MR scanner 110 and the processing device 120. As a further example, the storage device 130 may be connected with the processing device 120 directly (not shown in FIG. 1) or through the network 150. As still a further example, a terminal 140 may be connected with the processing device 120 directly (as indicated by the bi-directional arrow in dotted lines linking the terminal 140 and the processing device 120) or through the network 150.

The MR scanner 110 may scan a (part of) subject or locate within its detection region and generate MR signals relating to the (part of) subject. In the present disclosure, the terms "subject" and "object" are used interchangeably. Merely by way of example, the object may include a patient, a man-made object, etc. As another example, the object may include a specific portion, organ, and/or tissue of a patient. For example, the object may include head, brain, neck, body, shoulder, arm, thorax, cardiac, stomach, blood vessel, soft tissue, knee, feet, or the like, or any combination thereof. In some embodiments, the MR scanner 110 may be a close-bore scanner or an open-bore scanner.

In the present disclosure, the X axis, the Y axis, and the Z axis shown in FIG. 1 may form an orthogonal coordinate system. The X axis and the Z axis shown in FIG. 1 may be horizontal, and the Y axis may be vertical. As illustrated, the positive x-direction along the X axis may be from the right side to the left side of the MR scanner 110 seen from the direction facing the front of the MR scanner 110; the positive y-direction along the Y axis shown in FIG. 1 may be from the lower part to the upper part of the MR scanner 110; the positive z-direction along the Z axis shown in FIG. 1 may refer to a direction in which the object is moved out of the detection region (or referred to as the bore) of the MR scanner 110.

The MR scanner 110 may include a magnet assembly, a gradient coil assembly, and a radiofrequency (RF) coil assembly.

The magnet assembly may generate a first magnetic field (also referred to as a main magnetic field) that may be applied to a subject positioned inside the first magnetic field. The magnet assembly may include a permanent magnet, a superconducting electromagnet, a resistive electromagnet, etc. The magnet assembly may form the detection region and surround, along the z-direction, the object that is moved into or positioned within the detection region.

The gradient coil assembly may be located inside the magnet assembly. For example, the gradient coil assembly may be located in the detection region. The gradient coil assembly may surround, along the z-direction, the subject that is moved into or positioned within the detection region. The gradient coil assembly may be surrounded by the magnet assembly around the z-direction, and be closer to the subject than the magnet assembly. The gradient coil assembly may generate a second magnetic field (also referred to as a gradient field, including gradient field components Gx, Gy, and Gz). The second magnetic field may be superimposed on the main magnetic field generated by the magnet assembly and distort the main magnetic field so that the magnetic orientations of the protons of an object may vary as a function of their positions inside the gradient field, thereby encoding spatial information into MR signals generated by the region of the subject being imaged. The gradient coil assembly may include X coils (e.g., configured to generate the gradient field component Gx corresponding to the x-direction), Y coils (e.g., configured to generate the gradient field component Gy corresponding to the y-direction), and/or Z coils (e.g., configured to generate the gradient field component Gz corresponding to the z-direction). In some embodiments, the Z coils may be designed based on circular (Maxwell) coils, while the X coils and the Y coils may be designed on the basis of the saddle (Golay) coil configuration. The three sets of coils may generate three different magnetic field components that are used for position encoding. The gradient coil assembly may allow spatial encoding of MR signals for image reconstruction.

The RF coil assembly may include a plurality of RF coils. The RF coils may include one or more RF transmit coils and/or one or more RF receiver coils each of which includes one or more RF receiver coil units. The RF transmit coil(s) may transmit RF pulses to the subject. Under a coordinated action of the main magnetic field, the gradient magnetic field, and the RF pulses, MR signals relating to the subject may be generated in response to a pulse sequence. The RF receiver coils may acquire MR signals from the subject. The pulse sequence may be defined by imaging parameters and arrangement associated with the imaging parameters in time sequence. In some embodiments, the imaging parameters may include parameters (e.g., the number of excitations (NEX), a bandwidth, etc.) relating to an RF pulse emitted by the RF coil, parameters (e.g., a gradient direction, a duration for applying a gradient, etc.) relating to gradient fields generated by the gradient coil, parameters relating to the MR signals (e.g., an echo time (TE), echo train length (ETL), etc.). In some embodiments, the pulse sequence may be defined by one or more parameters relating to time, such as a repetition time (TR), an acquisition time (TA), etc. The MR signals may also be referred to as echo signals. The MR signals may be used to fill a k-space based on a sampling technique. Exemplary sampling techniques may include a Cartesian sampling technique, a spiral sampling technique, a radial sampling technique, a Z-sampling technique, an undersampling technique, etc. Taking the radial sampling technique as an example, the k-space may be filled based on the MR signals according to a plurality of radial trajectories. A trajectory for filling the k-space may also be referred to as a spoke. The plurality of spokes may have a center point. The plurality of spokes may be spaced by a preset azimuthal increment which may cause the spokes to be spaced with a constant time. Additionally, the plurality of spokes may rotate within a preset time interval by a preset angle (e.g., 111.25°).

In some embodiments, one or more RF coils may both transmit RF pulses and receive MR signals at different times. In some embodiments, the function, size, type, geometry, position, amount, and/or magnitude of the RF coil(s) may be determined or changed according to one or more specific conditions. For example, according to the difference in function and size, the RF coil(s) may be classified as volume coils and local coils. In some embodiments, an RF receiver coil unit may correspond to a channel for acquiring MR signals.

The received MR signal(s) may be sent to the processing device 120 directly or via the network 150 for image reconstruction and/or image data processing. In some embodiments, the MR scanner 110 may include an analog-to-digital converter (ADC) (not shown in FIG. 1). The analog-to-digital converter may convert MR signals received by one or more RF receiver coils into MR image data. The analog-to-digital converter may be a direct-conversion ADC, a successive-approximation ADC, a ramp-compare ADC, a Wilkinson ADC, an integrating ADC, a delta-encoded ADC, a pipeline ADC, a sigma-delta ADC, or the like, or a combination thereof.

The processing device 120 may process data and/or information obtained from the MR scanner 110, the terminal(s) 140, and/or the storage device 130. For example, the processing device 120 may obtain a plurality of sets of image data of a subject acquired by the MR scanner 110 and a set of reference image data of the subject. Each set of the plurality of sets of image data may be acquired from a channel corresponding to an RF receiver coil of an RF receiver coil array of the MR scanner 110. For each set of the plurality of sets of image data, the processing device 120 may determine a phase shift between the set of reference image data and the set of image data using a cross-correlation algorithm. The processing device 120 may also obtain a set of corrected image data of the channel by performing a phase correction for the set of image data based on the phase shift. The processing device 120 may also determine target image data of the subject based on the plurality of sets of corrected image data of the subject. The processing device 120 may further reconstruct a target image of the subject based on the target image data of the subject. In some embodiments, the reconstructed target image may be transmitted to the terminal(s) 140 for display on one or more display devices in the terminal(s) 140 and/or a storage device for storage. In some embodiments, the processing device 120 may be a single server or a server group. The server group may be centralized or distributed. In some embodiments, the processing device 120 may be local or remote. In some embodiments, the processing device 120 may be implemented on a computing device 200 having one or more components illustrated in FIG. 2 in the present disclosure.

The storage device 130 may store data and/or instructions. In some embodiments, the storage device 130 may store data obtained from the terminal 140 and/or the processing device 120. For example, the storage device 130 may store MR signals obtained from the MR scanner 110 and image data in a k-space domain or an image domain determined based on the MR signals. In some embodiments, the storage device 130 may store data and/or instructions that the processing device 120 may execute or use to perform exemplary methods described in the present disclosure. In some embodiments, the storage device 130 may include a mass storage device, a removable storage device, a volatile read-and-write memory, a read-only memory (ROM), or the like, or any combination thereof.

The terminal 140 may include a mobile device 140-1, a tablet computer 140-2, a laptop computer 140-3, or the like, or any combination thereof. In some embodiments, the terminal 140 may remotely operate the MR scanner 110. In some embodiments, the terminal 140 may receive information and/or instructions inputted by a user, and send the received information and/or instructions to the MR scanner 110 or the processing device 120 via the network 150. In some embodiments, the terminal 140 may receive data and/or information from the processing device 120. In some embodiments, the terminal 140 may be part of the processing device 120. In some embodiments, the terminal 140 may be omitted.

The network 150 may include any suitable network that can facilitate the exchange of information and/or data for the MRI system 100. In some embodiments, one or more components of the MRI system 100 (e.g., the MR scanner 110, the terminal 140, the processing device 120, or the storage device 130) may communicate information and/or data with one or more other components of the MRI system 100 via the network 150. For example, the processing device 120 may obtain MR signals from the MR scanner 110 via the network 150. As another example, the processing device 120 may obtain user instructions from the terminal 140 via the network 150. In some embodiments, the network 150 may be any type of wired or wireless network, or a combination thereof. The network 150 may include any suitable network that can facilitate the exchange of information and/or data for the MRI system 100. In some embodiments, one or more components of the MRI system 100 (e.g., the MR scanner 110, the terminal 140, the processing device 120, the storage device 130, etc.) may transmit or receive information and/or data with one or more other components of the MRI system 100 via the network 150.

FIG. 2 is a schematic diagram illustrating hardware and/or software components of an exemplary computing device 200 on which the processing device 120 may be implemented according to some embodiments of the present disclosure. As illustrated in FIG. 2, the computing device 200 may include a processor 210, a storage device 220, an input/output (I/O) 230, and a communication port 240.

The processor 210 may execute computer instructions (program code) and perform functions of the processing device 120 in accordance with the techniques described herein. The computer instructions may include, for example, routines, programs, objects, components, signals, data structures, procedures, modules, and functions, which perform particular functions described herein. For example, the processor 210 may process data obtained from the MR scanner 110, the terminal 140, the storage device 130, and/or any other component of the MRI system 100.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both process A and process B, it should be understood that process A and process B may also be performed by two or more different processors jointly or separately in the computing device 200 (e.g., a first processor executes process A and a second processor executes process B, or the first and second processors jointly execute processes A and B).

The storage device 220 may store data/information obtained from the MR scanner 110, the terminal 140, the storage device 130, or any other component of the MRI system 100. In some embodiments, the storage device 220 may include a mass storage device, a removable storage device, a volatile read-and-write memory, a read-only memory (ROM), or the like, or any combination thereof. In some embodiments, the storage device 220 may store one or more programs and/or instructions to perform exemplary methods described in the present disclosure.

The I/O 230 may input or output signals, data, and/or information. In some embodiments, the I/O 230 may enable user interaction with the processing device 120. In some embodiments, the I/O 230 may include an input device and an output device. Exemplary input devices may include a keyboard, a mouse, a touch screen, a microphone, or the like, or a combination thereof. Exemplary output devices may include a display device, a loudspeaker, a printer, a projector, or the like, or a combination thereof.

The communication port 240 may be connected with a network (e.g., the network 150) to facilitate data communications. The communication port 240 may establish connections between the processing device 120 and the MR scanner 110, the terminal 140, or the storage device 130. The connection may be a wired connection, a wireless connection, or a combination of both that enables data transmission and reception.

Figure 3:
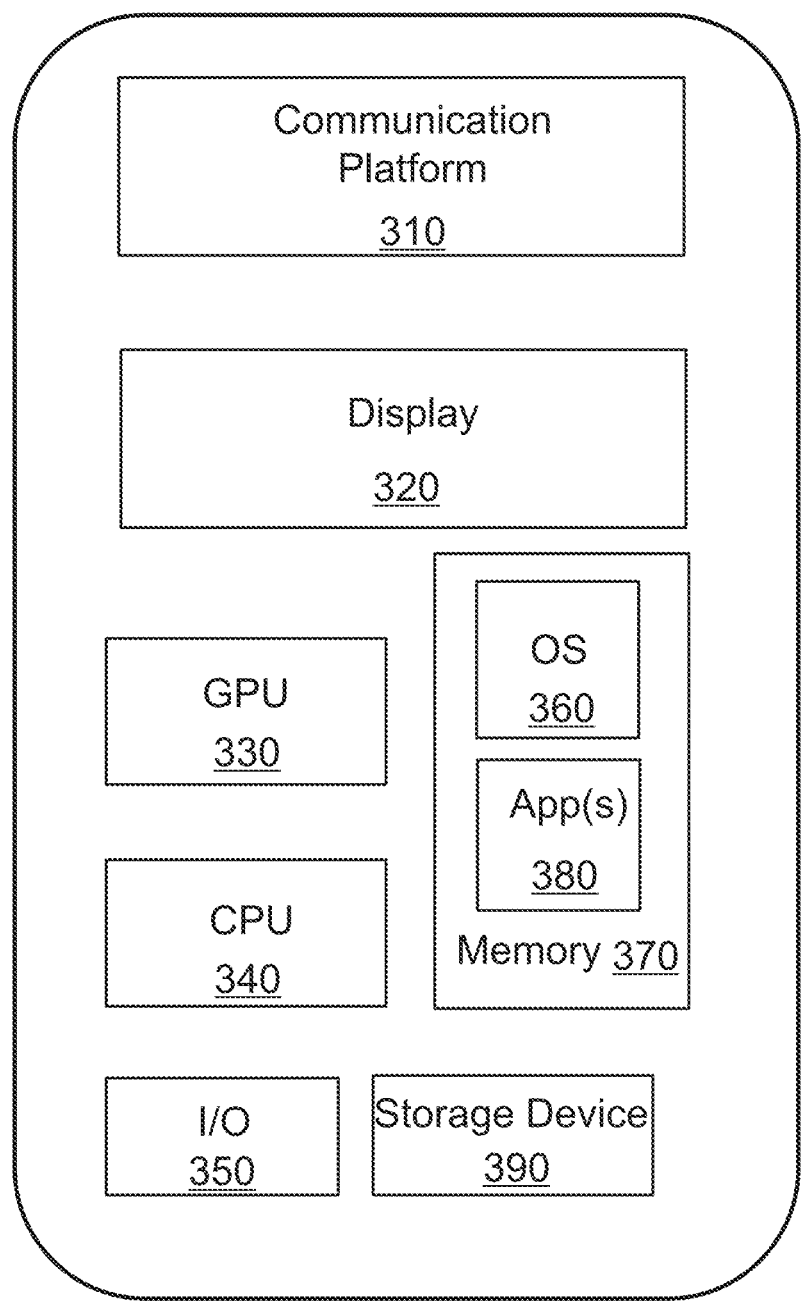
FIG. 3 is a schematic diagram illustrating hardware and/or software components of an exemplary mobile device according to some embodiments of the present disclosure.

FIG. 3 is a schematic diagram illustrating hardware and/or software components of an exemplary mobile device 300 according to some embodiments of the present disclosure. As illustrated in FIG. 3, the mobile device 300 may include a communication platform 310, a display 320, a graphics processing unit (GPU) 330, a central processing unit (CPU) 340, an I/O 350, a memory 360, and a storage device 390. In some embodiments, any other suitable component, including but not limited to a system bus or a controller (not shown), may also be included in the mobile device 300. In some embodiments, a mobile operating system 370 (e.g., iOS, Android, Windows Phone, etc.) and one or more applications 380 may be loaded into the memory 360 from the storage device 390 in order to be executed by the CPU 340. The applications 380 may include a browser or any other suitable mobile apps for receiving and rendering information relating to image processing or other information from the processing device 120. User interactions with the information stream may be achieved via the I/O 350 and provided to the processing device 120 and/or other components of the MRI system 100 via the network 150.

To implement various modules, units, and their functionalities described in the present disclosure, one or more computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to generate an image with reduced Nyquist ghost artifact as described herein. A computer with user interface elements may be used to implement a personal computer (PC) or another type of workstation or terminal device, although a computer may also act as a server if appropriately programmed. It is believed that those skilled in the art are familiar with the structure, programming and general operation of such computer equipment and as a result, the drawings should be self-explanatory.

Figure 4:
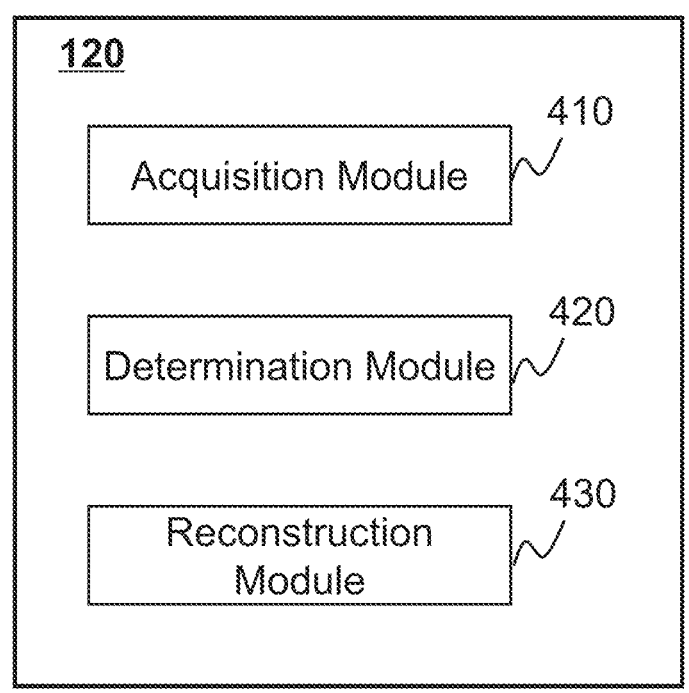
FIG. 4 is a block diagram illustrating an exemplary processing device according to some embodiments of the present disclosure.

FIG. 4 is a block diagram illustrating an exemplary processing device 120 according to some embodiments of the present disclosure. In some embodiments, the processing device 120 may be implemented on a processing unit (e.g., a processor 210 illustrated in FIG. 2 or a CPU 340 as illustrated in FIG. 3). As shown in FIG. 4, the processing device 120 may include an acquisition module 410, a determination module 420, and a reconstruction module 430.

The acquisition module 410 may be configured to obtain information relating to the MRI system 100. For example, the acquisition module 410 may obtain a plurality of sets of image data (also referred to as a plurality of first sets of image data) of a subject acquired by a magnetic resonance (MR) scanner. More descriptions regarding the obtaining of the plurality of sets of image data of the subject acquired by a magnetic resonance (MR) scanner may be found elsewhere in the present disclosure. See, e.g., operation 510 in FIG. 5, and relevant descriptions thereof.

The determination module 420 may be configured to obtain a set of reference image data of the subject. In some embodiments, the set of reference image data of the subject may include image data in the image domain, image data in the k-space domain (i.e., the frequency domain), or image data in the image and k-space hybrid domain. In some embodiments, the set of reference image data may be determined based on the plurality of sets of image data that are used to generate a target image as described elsewhere in the present disclosure. In some embodiments, the set of reference image data may be determined based on image data that are different from the plurality of sets of image data used to generate a target image. More descriptions regarding the obtaining of the set of reference image data of the subject may be found elsewhere in the present disclosure. See, e.g., operation 520 in FIG. 5, and relevant descriptions thereof.

The determination module 420 may be also configured to determine a phase shift between the set of reference image data and each set of the plurality of sets of image data using the cross-correlation algorithm. In some embodiments, for each set of the plurality of sets of image data, the determination module 420 may determine a cross-correlation coefficient between the set of reference image data and the set of image data using the cross-correlation algorithm. The determination module 420 may further determine the phase shift between the set of reference image data and the set of image data based on the cross-correlation coefficient. More descriptions regarding the determination of the phase shift between the set of reference image data and each set of the plurality of sets of image data may be found elsewhere in the present disclosure. See, e.g., operation 530 in FIG. 5, and relevant descriptions thereof.

The determination module 420 may be also configured to obtain, based on the phase shift between the set of reference image data and each set of the plurality of sets of image data, a plurality of sets of corrected image data by performing a phase correction for each set of the plurality of sets of image data. In some embodiments, for each set of the plurality of sets of image data, each element of the set of image data may be corrected with respect to the phase shift relative to the set of reference image data by performing a phase correction. The determination module 420 may designate an element value of each element of the set of image data divided by the phase shift as a corrected element value of the element. The determination module 420 may further obtain the set of corrected image data according to corrected element values of the elements of the set of image data.

The determination module 420 may be also configured to determine target image data (also referred to as first target image data) of the subject based on the plurality of sets of corrected image data of the subject. In some embodiments, the determination module 420 may determine a sum of at least some sets of the plurality of sets of corrected image data of the subject as the target image data of the subject. More descriptions regarding the determination of the target image data of the subject may be found elsewhere in the present disclosure. See, e.g., operation 550 in FIG. 5, and relevant descriptions thereof.

The reconstruction module 430 may be configured to reconstruct a target image (also referred to as a first target image) of the subject based on the target image data of the subject. In some embodiments, the target image of the subject may include a target phase image or a target amplitude image of the subject. More descriptions regarding the reconstruction of the target image of the subject may be found elsewhere in the present disclosure. See, e.g., operation 560 in FIG. 5, and relevant descriptions thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the processing device 120 may further include a storage module (not shown in FIG. 4). The storage module may be configured to store data generated during any process performed by any component of the processing device 120. As another example, each of at least some components of the processing device 120 may include a storage apparatus. Additionally or alternatively, at least some components of the processing device 120 may share a common storage apparatus.

Figure 5:
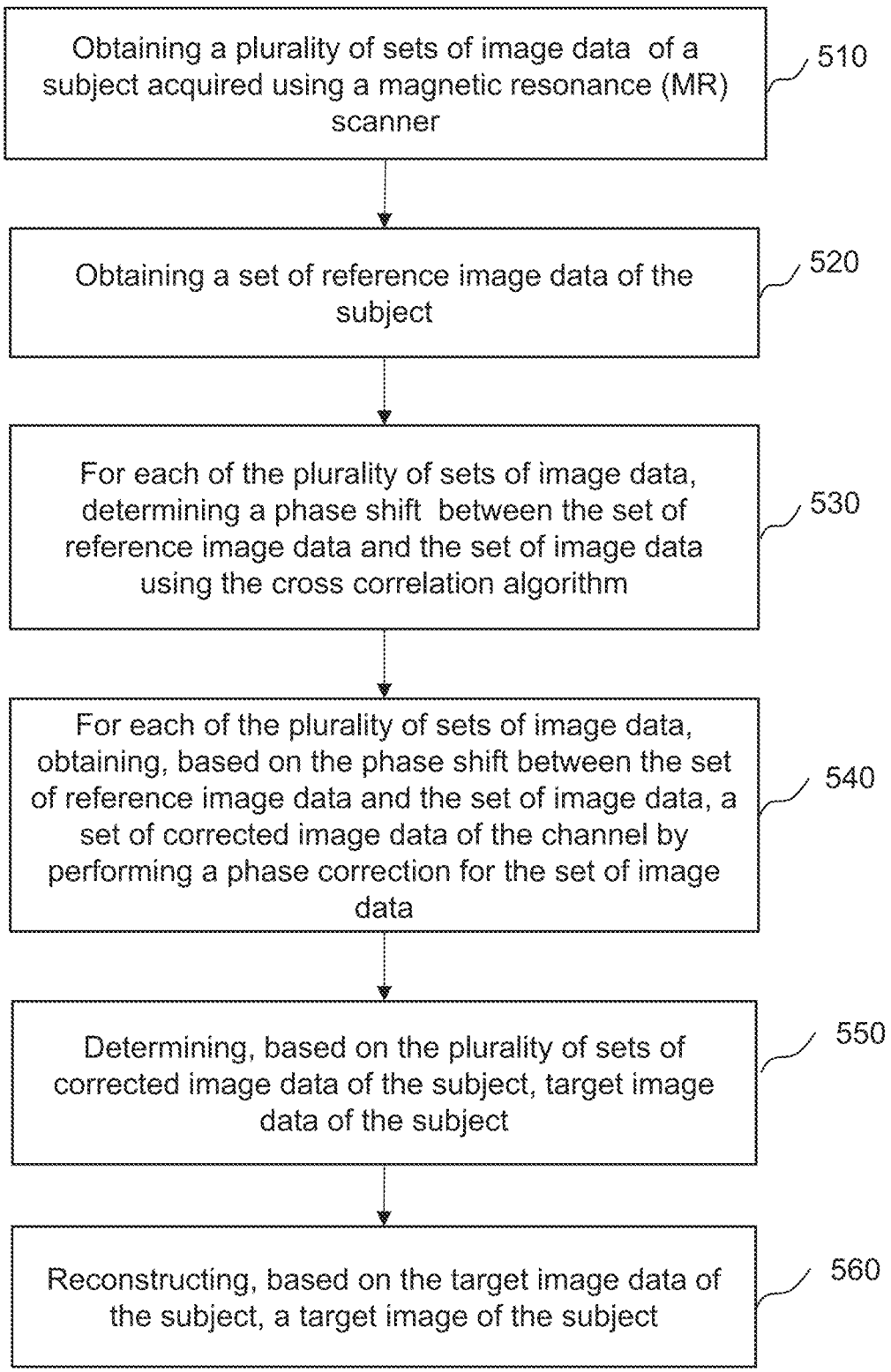
FIG. 5 is a flowchart illustrating an exemplary process for MRI data processing according to some embodiments of the present disclosure.

FIG. 5 is a flowchart illustrating an exemplary process 500 for MRI data processing according to some embodiments of the present disclosure. In some embodiments, the process 500 may be implemented in the MRI system 100 illustrated in FIG. 1. For example, the process 500 may be stored in a storage (e.g., the storage device 130, the storage device 220, the storage device 390) as a form of instructions, and invoked and/or executed by the processing device 120 (e.g., the processor 210 of the computing device 200 as illustrated in FIG. 2, the CPU 340 of the mobile device 300 as illustrated in FIG. 3, and/or one or more modules as illustrated in FIG. 4). The operations of the illustrated process presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting.

In 510, the processing device 120 (e.g., the acquisition module 410) may obtain a plurality of sets of image data (also referred to as a plurality of first sets of image data) of a subject acquired by a magnetic resonance (MR) scanner.

As used herein, the subject may include a biological subject and/or a non-biological subject. For example, the subject may be a human being, an animal, or a portion thereof. As another example, the subject may be a phantom. In some embodiments, the subject may be a patient, or a portion of the patient (e.g., the chest, a breast, and/or the abdomen of the patient).

In some embodiments, the MR scanner may include a coil array (also referred to as a first coil array) including a plurality of coil units (also referred to as a plurality of first coil units). For example, the coil array may include at least one array coil (e.g., a head coil) each of which is formed by multiple coil units. The relative physical position of the multiple coil units in each array coil are arranged by design and are fixated. As another example, the coil array may include one or more individual array coils that are independently manufactured, and the relative physical position during use is not fixated. As still another example, the coil array may include at least one array coil and at least one individual coil with only one coil unit. As used herein, a coil unit of the coil array of the MR scanner refers to an RF receiver coil unit. More descriptions for the RF receiver coil unit may be found elsewhere in the present disclosure (e.g., FIG. 1 and the descriptions thereof).

In some embodiments, the coil array may receive a plurality of channels of MR signals (also referred to as a plurality of channels of first MR signals). In some embodiments, the plurality of channels of MR signals may be acquired by scanning the subject (e.g., an organ, a tissue, etc.) according to a pulse sequence (also referred to as a first pulse sequence) using an MR scanner (e.g., the MR scanner 110). Exemplary pulse sequences may include a spin-echo sequence (SE), a gradient-echo sequence (GRE), etc. A plurality of sets of image data may be generated based on the plurality of channels of MR signals. In some embodiments, a coil unit may correspond to a channel for acquiring MR signals. Each set of the plurality of sets of image data may be acquired from a channel corresponding to a coil unit of the coil array; that is, the set of image data may be generated based on the channel of MR signals received by the coil unit of the coil array.

In some embodiments, the plurality of sets of image data of the subject may include image data in an image domain, image data in a k-space domain (i.e., a frequency domain), or image data in an image and k-space hybrid domain. A set of image data in the k-space domain may be generated by filling a k-space using one channel of MR signals of the plurality of channels of MR signals received by one coil unit of the coil array based on a sampling technique. More descriptions for the sampling technique may be found elsewhere in the present disclosure (e.g., FIG. 1 and the descriptions thereof). In some embodiments, the image data in the k-space domain may be raw image data in the k-space domain generated by directly filling the k-space using the plurality of channels of MR signals. Alternatively, the image data in the k-space domain may be image data in the k-space domain reconstructed based on the raw image data in the k-space domain. In some embodiments, the image data in the image domain may be generated by performing an inverse Fourier transform on the image data in the k-space domain. As used herein, the image and k-space hybrid domain refers to a multi-dimensional domain including the k-space domain and the image domain; that is, at least one dimension of the image and k-space hybrid domain corresponds to the k-space domain and the remaining dimension(s) of the image and k-space hybrid domain correspond to the image domain. Accordingly, the image data in the at least one dimension corresponding to the k-space domain of the image and k-space hybrid domain may be image data in the k-space domain, and the image data in the remaining dimension(s) corresponding to the image domain of the image and k-space hybrid domain may be image data in the image domain. For example, one dimension of a three-dimensional (3D) image and k-space hybrid domain may correspond to the k-space domain, and the remaining two dimensions may correspond to the image domain; accordingly, the image data in the dimension corresponding to the k-space domain of the 3D image and k-space hybrid domain may be image data in the k-space domain, and the image data in the remaining two dimensions corresponding to the image domain of the 3D image and k-space hybrid domain may be image data in the image domain.

In some embodiments, the processing device 120 may obtain the plurality of channels of MR signals from the MR scanner and generate the plurality of sets of image data based on the plurality of channels of MR signals. In some embodiments, the plurality of sets of image data may be previously generated based on the plurality of channels of MR signals and stored in a storage device (e.g., the storage device 130, the storage device 220, the storage device 390, or an external source). The processing device 120 may retrieve the plurality of sets of image data directly from the storage device.

In 520, the processing device 120 (e.g., the determination module 420) may obtain a set of reference image data of the subject.

In some embodiments, the set of reference image data of the subject may include image data in the image domain, image data in the k-space domain (i.e., the frequency domain), or image data in the image and k-space hybrid domain.

In some embodiments, the set of reference image data may be determined based on the plurality of sets of image data that are used to generate a target image as described elsewhere in the present disclosure. See, e.g., operation 560 and the description thereof. In some embodiments, the set of reference image data may be determined based on image data that are different from the plurality of sets of image data used to generate a target image. For instance, the set of reference image data may be determined based on image data that are acquired by performing another scanning of the subject that is different from a scanning from which the plurality of sets of image data used to determine the target image is acquired. Merely by way of example, the image data used to determine the set of reference image data may be determined based on MR signals acquired in another scanning using a coil array that is the same as or different from the coil array for acquiring the plurality of sets of image data used to determine the target image.

In some embodiments, the processing device 120 may determine the set of reference image data of the subject based on the plurality of sets of image data used to determine a target image.

For instance, the processing device 120 may directly combine at least some sets of the plurality of sets of image data to obtain a set of combined image data, and designate the set of combined image data as the set of reference image data. Merely for illustration purposes, the processing device 120 may determine a sum of at least some sets of the plurality of sets of image data and designate the sum as the set of reference image data.

As another example, the processing device 120 may determine the set of reference image data of the subject based on the plurality of sets of image data by considering amplitudes of the plurality of sets of image data or signal strengths of the corresponding channels of MR signals on the bases of which the plurality of sets of image data are determined. In some embodiments, signal strengths (also referred to as signal intensities) of the plurality of channels of MR signals received by the coil array may be different. That is, the plurality of sets of image data generated based on the plurality of channels of MR signals may correspond to different signal strengths. The processing device 120 may designate a set of image data with a maximum signal strength as the set of reference image data of the subject from the plurality of sets of image data. Target image data of the subject obtained based on the set of reference image data with the maximum signal strength by performing operations 530-550 may be relatively more accurate and robust. Thus, the quality of a target image of the subject obtained based on the target image data may be improved. For example, a probability of phase singularity artifacts in a phase image obtained based on the target image data may be relatively low.

As still another example, the processing device 120 may determine the set of reference image data of the subject based on the plurality of sets of image data by considering degrees of correlation between the plurality of sets of image data. In some embodiments, for each set of the plurality of sets of image data, the processing device 120 may obtain a degree of correlation between the set of image data and each set of the remaining sets of the plurality of sets of image data using a cross-correlation algorithm. That is, the processing device 120 may obtain a degree of correlation between each two sets of image data of the plurality of sets of image data using a cross-correlation algorithm. As used herein, that the processing device 120 may obtain a degree of correlation refers to that the processing device 120 may determine a degree of correlation or that the processing device 120 may obtain a degree of correlation that is previously determined. For example, the plurality of sets of image data include a set of image data M1, a set of image data M2, a set of image data M3, and a set of image data M4. For the set of image data M1, the processing device 120 may determine a degree of correlation N12 between the set of image data M1 and the set of image data M2, a degree of correlation N13 between the set of image data M1 and the set of image data M3, and a degree of correlation N14 between the set of image data M1 and the set of image data M4 using the cross-correlation algorithm. For the set of image data M2, the processing device 120 may directly obtain the degree of correlation N12 between the set of image data M1 and the set of image data M2. The processing device 120 may determine a degree of correlation N23 between the set of image data M2 and the set of image data M3, and a degree of correlation N24 between the set of image data M2 and the set of image data M4 using the cross-correlation algorithm.

In some embodiments, the processing device 120 may determine a degree of correlation between two sets of image data using the cross-correlation algorithm. Merely by way of example, the processing device 120 may determine a cross-correlation coefficient between a set of image data P1 and a set of image data P2 using the cross-correlation algorithm. In some embodiments, the determination of the cross-correlation coefficient between the set of image data P1 and the set of image data P2 may be performed in a similar manner as that of the cross-correlation coefficient between the set of reference image data and the set of image data as described in connection with operation 530, and the descriptions of which are not repeated here. The processing device 120 may determine the degree of correlation between the set of image data P1 and the set of image data P2 based on the cross-correlation coefficient between the set of image data P1 and the set of image data P2. For example, the processing device 120 may designate a value of the cross-correlation coefficient as the degree of correlation between the set of image data P1 and the set of image data P2.

The processing device 120 may determine the set of reference image data of the subject based on the degrees of correlation between the plurality of sets of image data. For example, the processing device 120 may identify, among the degrees of correlations between the plurality of sets of image data, a maximum degree of correlation, and then identify a set of image data D1 and a set of image data D2 corresponding to the maximum degrees of correlation. In some embodiments, the processing device 120 may designate one of the set of image data D1 or the set of image data D2 as the set of reference image data of the subject. For instance, the processing device 120 may designate the set of image data D1 as the set of reference image data of the subject in which a signal strength of the set of image data D1 may be greater than a signal strength of the set of image data D2. Alternatively, the processing device 120 may combine the set of image data D1 and the set of image data D2 into a set of combined image data D3. The processing device 120 may designate the set of combined image data D3 as the set of reference image data of the subject.

As still another example, the processing device 120 may determine the set of reference image data of the subject based on the plurality of sets of image data by combining at least two sets of processed image data. In some embodiments, the processing device 120 may obtain a set of initial reference image data (also referred to as a set of first initial reference image data) of the subject from the plurality of sets of image data. For example, the processing device 120 may designate a set of image data with a maximum signal strength as the set of initial reference image data of the subject from the plurality of sets of image data. For each set of at least one set of the plurality of sets of image data, the processing device 120 may determine a phase shift between the set of initial reference image data and the set of image data using the cross-correlation algorithm. In some embodiments, the determination of the phase shift between the set of initial reference image data and the set of image data may be performed in a similar manner as that of a phase shift between the set of reference image data and the set of image data as described in connection with operation 530, and the descriptions of which are not repeated here. The processing device 120 may obtain a set of corrected initial image data by performing a phase correction for the set of image data based on the phase shift between the set of initial reference image data and the set of image data. In some embodiments, the obtaining of the set of corrected initial image data may be performed in a similar manner as that of a set of corrected image data as described in connection with operation 540, and the descriptions of which are not repeated here. The processing device 120 may determine the set of reference image data of the subject based on the at least one set of corrected initial image data. In some embodiments, the determination of the set of reference image data of the subject based on the at least one set of corrected initial image data may be performed in a similar manner as that of target image data of the subject based on a plurality of sets of corrected image data as described in connection with operation 550, and the descriptions of which are not repeated here.

In some embodiments, the set of reference image data may be a composite set determined by combining multiple sets of initial or processed image data, an exemplary process of which is provided as follows. For each set of at least some of the plurality of sets of image data, the processing device 120 may determine a phase shift between a set of prior reference image data determined previously and the set of image data using the cross-correlation algorithm. In some embodiments, all sets of the plurality of sets of image data may be used in determining phase shifts. In some embodiments, at least some sets of the plurality of sets of image data may be used in determining phase shifts. The processing device 120 may determine a set of corrected image data of the channel by performing a phase correction for the set of image data based on the phase shift between the set of prior reference image data and the set of image data. More descriptions for the determining of the phase shift and the obtaining of the set of corrected image data may be found elsewhere in the present disclosure. See, e.g., operations 530 and 540 in FIG. 5 and relevant descriptions thereof. The processing device 120 may determine a set of current combined image data of the subject by combining the set of corrected image data and the set of prior reference image data determined previously. For example, the processing device 120 may determine a sum of the set of corrected image data and the set of prior reference image data determined previously as the set of current combined image data of the subject. The processing device 120 may designate the set of current combined image data of the subject as the set of prior reference image data, or the set of reference image data (also referred to as a set of final reference image data) when all sets of the at least some of the plurality of sets of image data are processed similarly. In some embodiments, a set of initial reference image data (i.e., a set of reference image data obtained for the first time) of the subject may be obtained from the plurality of sets of image data. For example, the processing device 120 may designate a set of image data with a maximum signal strength as the set of initial reference image data of the subject from the plurality of sets of image data.

In some embodiments, the set of reference image data may be determined based on image data that are different from the plurality of sets of image data used to generate a target image. For instance, the set of reference image data may be determined based on image data that are acquired by performing another scanning of the subject that is different from a scanning from which the plurality of sets of image data used to determine the target image is acquired.

In some embodiments, the processing device 120 may obtain a plurality of second sets of image data of the subject acquired by a second coil array of the MR scanner. The second coil array may include a plurality of second coil units. As used herein, a second coil unit of the second coil array of the MR scanner refers to an RF receiver coil unit. In some embodiments, the second coil array may receive a plurality of second channels of MR signals acquired by scanning the subject according to a second pulse sequence using the MR scanner (e.g., the MR scanner 110). The second pulse sequence may be the same as or different from the first pulse sequence. The plurality of second sets of image data may be generated based on the plurality of second channels of MR signals. Each set of the plurality of second sets of image data may be acquired from a second channel corresponding to a second coil unit of the second coil array. In some embodiments, the plurality of second channels of MR signals and the plurality of channels of MR signals may be generated according to same or different scanning parameters. For example, the plurality of second channels of MR signals may be generated according to a second echo time (TE) shorter than a first TE for generating the plurality of channels of MR signal. In some embodiments, one or more parameters of the second coil array may be the same as or different from parameters of the coil array (i.e., the first coil array) for acquiring the plurality of sets of image data used to determine the target image. Exemplary parameters of a coil array include a count of coil units in the coil array, a shape, a size, a material of each coil unit in the coil array, a coupling manner between the coil units in the coil array, etc. In some embodiments, a position of the second coil array during scanning may be (substantially) the same as a position of the first coil array during scanning. For example, a center of the second coil array may (substantially) coincide with a center of the first coil array, and/or a distance from the second coil array to the subject may be (substantially) the same as a distance from the first coil array to the subject. As used herein, substantially, when used to describe a feature (e.g., the feature of A being the same as B), indicates that the deviation from the feature is below a threshold. Merely by way of example, a center of the second coil array substantially coinciding with a center of the first coil array may indicate that the distance between the two centers is below a threshold, e.g., 1 millimeter, 2 millimeters. In some embodiments, the plurality of second sets of image data of the subject may be obtained in a similar manner as how the plurality of sets of image data of the subject are obtained as described in connection with operation 510, and the descriptions of which are not repeated here. The processing device 120 may determine the set of reference image data of the subject based on the plurality of second sets of image data.

For instance, the processing device 120 may directly combine at least some second sets of the plurality of second sets of image data to obtain a second set of combined image data, and designate the second set of combined image data as the set of reference image data. Merely for illustration purposes, the processing device 120 may determine a sum of at least some second sets of the plurality of sets of image data and designate the sum as the set of reference image data.

As another example, the processing device 120 may determine the set of reference image data of the subject based on the plurality of second sets of image data by considering amplitudes of the plurality of second sets of image data or signal strengths of the corresponding second channels of MR signals on the bases of which the plurality of second sets of image data are determined. In some embodiments, signal strengths of a plurality of second channels of MR signals received by the second coil array may be different. That is, the plurality of second sets of image data generated based on the plurality of second channels of MR signals may correspond to different signal strengths. The processing device 120 may designate a second set of image data with a maximum signal strength as the set of reference image data of the subject from the plurality of second sets of image data.

As still another example, the processing device 120 may determine the set of reference image data of the subject based on the plurality of second sets of image data by considering degrees of correlation between the plurality of second sets of image data. In some embodiments, for each set of the plurality of second sets of image data, the processing device 120 may obtain a degree of correlation between the second set of image data and each second set of the remaining second sets of the plurality of second sets of image data using the cross-correlation algorithm. That is, the processing device 120 may obtain a degree of correlation between each two second sets of image data of the plurality of second sets of image data using the cross-correlation algorithm. In some embodiments, the obtaining of a degree of correlation between two second sets of image data may be performed in a similar manner as that of a degree of correlation between two sets of image data as aforementioned, and the descriptions of which are not repeated here. The processing device 120 may determine the set of reference image data of the subject based on the degrees of correlation between the plurality of second sets of image data. For example, the processing device 120 may identify, among the degrees of correlation between the plurality of second sets of image data, a maximum degree of correlation, and then identify a second set of image data A and a second set of image data B corresponding to the maximum degree of correlation. In some embodiments, the processing device 120 may designate one of the second set of image data A or the second set of image data B as the set of reference image data of the subject. For instance, the processing device 120 may designate the second set of image data A as the set of reference image data of the subject in which a signal strength of the second set of image data A may be greater than a signal strength of the second set of image data B. Alternatively, the processing device 120 may combine the second set of image data A and the second set of image data B into a second set of combined image data C. The processing device 120 may designate the second set of combined image data C as the set of reference image data of the subject.

As still another example, the processing device 120 may determine the set of reference image data of the subject based on the plurality of second sets of image data by combining multiple second sets of processed image data. In some embodiments, the processing device 120 may obtain a set of initial reference image data (also referred to as a set of second initial reference image data) of the subject from the plurality of second sets of image data. For example, the processing device 120 may designate a second set of image data with a maximum signal strength as the set of second initial reference image data of the subject from the plurality of second sets of image data. For each set of the plurality of second sets of image data, the processing device 120 may determine a phase shift between the set of second initial reference image data and the second set of image data using the cross-correlation algorithm. In some embodiments, the determination of the phase shift between the set of second initial reference image data and the second set of image data may be performed in a similar manner as that of a phase shift between the set of reference image data and the set of image data as described in connection with operation 530, and the descriptions of which are not repeated here. The processing device 120 may obtain the second set of corrected image data of the second channel acquired the second set of image data by performing a phase correction for the second set of image data based on the phase shift between the set of second initial reference image data and the second set of image data. In some embodiments, the obtaining of the set of second corrected image data may be performed in a similar manner as that of a set of corrected image data as described in connection with operation 540, and the descriptions of which are not repeated here. The processing device 120 may determine the reference image data of the subject based on the plurality of second sets of corrected image data. In some embodiments, the determination of the set of reference image data of the subject based on the plurality of second sets of corrected image data may be performed in a similar manner as that of target image data of the subject based on a plurality of sets of corrected image data as described in connection with operation 550, and the descriptions of which are not repeated here.

In some embodiments, the processing device 120 may obtain a third set of image data of the subject acquired by a coil with only one third coil unit of the MR scanner. The processing device 120 may designate the third set of image data as the set of reference image data of the subject. In some embodiments, the third coil unit may be an RF receiver coil unit of a coil array (e.g., the first coil array, the second coil array, etc.) or an individual RF receiver coil. Merely by way of example, a center of the individual RF receiver coil may (substantially) coincide with the center of the first coil array, and/or a distance from the individual RF receiver coil to the subject may be (substantially) the same as the distance from the first coil array to the subject. In some occasions, the set of reference image data acquired by the third coil unit may be relatively accurate. For example, if a size of the subject is small and relatively complete image data of the subject is acquired by only one RF receiver coil unit, the set of reference image data of the subject acquired by the third coil unit may be relatively accurate. As another example, if the third coil unit (e.g., a body coil unit) has (substantially) a uniform sensitivity over various parts of the subject, the set of reference image data of the subject acquired by the third coil unit may be relatively accurate.

In some embodiments, the processing device 120 may obtain a plurality of sets of second image data of the subject acquired by the coil array of the MR scanner. In some embodiments, the coil array may receive a plurality of channels of second MR signals acquired by scanning the subject (e.g., an organ, a tissue, etc.) according to a third pulse sequence using the MR scanner (e.g., the MR scanner 110). The third pulse sequence may be the same as or different from the first pulse sequence. The plurality of sets of second image data may be generated based on the plurality of channels of second MR signals. Each set of the plurality of sets of second image data may be acquired from a channel corresponding to a coil unit of the coil array. In some embodiments, the plurality of channels of second MR signals and the plurality of channels of first MR signals may be generated according to same or different scanning parameters. For example, the plurality of channels of second MR signals may be generated according to a third echo time (TE) shorter than the first TE for generating the plurality of channels of first MR signals. In some embodiments, the plurality of sets of second image data of the subject may be obtained in a similar manner as how the plurality of sets of image data of the subject are obtained as described in connection with operation 510, and the descriptions of which are not repeated here. The processing device 120 may determine the set of reference image data of the subject based on the plurality of sets of second image data.

For instance, the processing device 120 may directly combine at least some sets of the plurality of sets of second image data to obtain a set of combined second image data, and designate the set of combined second image data as the set of reference image data. Merely for illustration purposes, the processing device 120 may determine a sum of at least some sets of the plurality of sets of second image data and designate the sum as the set of reference image data.

As another example, the processing device 120 may determine the set of reference image data of the subject based on the plurality of sets of second image data by considering amplitudes of the plurality of sets of second image data or signal strengths of the corresponding channels of second MR signals on the bases of which the plurality of sets of second image data are determined. In some embodiments, the processing device 120 may designate a set of second image data with a maximum signal strength as the set of reference image data of the subject from the plurality of sets of second image data.

As still another example, the processing device 120 may determine the set of reference image data of the subject based on the plurality of sets of second image data by considering degrees of correlation between the plurality of sets of second image data. In some embodiments, for each set of the plurality of sets of second image data, the processing device 120 may obtain a degree of correlation between the set of second image data and each set of the remaining sets of the plurality of sets of second image data using the cross-correlation algorithm. That is, the processing device 120 may obtain a degree of correlation between each two sets of second image data of the plurality of sets of second image data using the cross-correlation algorithm. In some embodiments, the obtaining of a degree of correlation between two sets of second image data may be performed in a similar manner as that of a degree of correlation between two sets of image data as aforementioned, and the descriptions of which are not repeated here. The processing device 120 may determine the set of reference image data of the subject based on the degrees of correlation between the plurality of sets of second image data. For example, the processing device 120 may identify, among the degrees of correlation between the plurality of sets of second image data, a maximum degree of correlation, and then identify a set of second image data G1 and a set of second image data G2 corresponding to the maximum degree of correlation. In some embodiments, the processing device 120 may designate one of the set of second image data G1 or the set of second image data G2 as the set of reference image data of the subject. For instance, the processing device 120 may designate the set of second image data G1 as the set of reference image data of the subject in which a signal strength of the set of second image data G1 may be greater than a signal strength of the set of second image data G2. Alternatively, the processing device 120 may combine the set of second image data G1 and the set of second image data G2 into a set of combined second image data G3. The processing device 120 may designate the set of combined second image data G3 as the set of reference image data of the subject.

As still another example, the processing device 120 may determine the set of reference image data of the subject based on the plurality of sets of second image data by combining multiple sets of processed second image data. In some embodiments, the processing device 120 may obtain a set of initial reference image data (also referred to as a set of third initial reference image data) of the subject from the plurality of sets of second image data. For example, the processing device 120 may designate a set of second image data with a maximum signal strength as the set of third initial reference image data of the subject from the plurality of sets of second image data. For each set of the plurality of sets of second image data, the processing device 120 may determine a phase shift between the set of third initial reference image data and the set of second image data using the cross-correlation algorithm. In some embodiments, the determination of the phase shift between the set of third initial reference image data and the set of second image data may be performed in a similar manner as that of a phase shift between the set of reference image data and the set of image data as described in connection with operation 530, and the descriptions of which are not repeated here. The processing device 120 may obtain the set of corrected second image data of the channel acquired the set of second image data by performing a phase correction for the set of second image data based on the phase shift between the set of third initial reference image data and the set of second image data. In some embodiments, the obtaining of the set of corrected second image data may be performed in a similar manner as that of a set of corrected image data as described in connection with operation 540, and the descriptions of which are not repeated here. The processing device 120 may determine the reference image data of the subject based on the plurality of sets of corrected second image data. In some embodiments, the determination of the set of reference image data of the subject based on the plurality of sets of corrected second image data may be performed in a similar manner as that of target image data of the subject based on a plurality of sets of corrected image data as described in connection with operation 550, and the descriptions of which are not repeated here.

In some embodiments, the processing device 120 may determine the reference image data of the subject using other approaches. For example, the processing device 120 may determine a weighted sum of the plurality of sets of image data. A weight of each set of the plurality of sets of image data may be determined according to a coil sensitivity of each coil unit of the coil array. As used herein, a coil sensitivity of a coil unit refers to a response degree of the coil unit for receiving a signal (e.g., an MR signal). The processing device 120 may designate the weighted sum of the plurality of sets of image data as the reference image data of the subject.

In 530, for each set of the plurality of sets of image data, the processing device 120 (e.g., the determination module 420) may determine a phase shift between the set of reference image data and the set of image data using the cross-correlation algorithm.

In some embodiments, the processing device 120 may determine a cross-correlation coefficient between the set of reference image data and the set of image data using the cross-correlation algorithm.

In some embodiments, when the cross-correlation coefficient between the set of reference image data and the set of image data is determined, the set of reference image data and the set of image data may be image data in a same domain. For instance, the set of image data and the set of reference image data may both be image data in the image domain. As another example, the set of image data and the set of reference image data may both be image data in the k-space domain. As still another example, the set of image data and the set of reference image data may both be image data in a same image and k-space hybrid domain. If the set of reference image data and the set of image data are image data in different domains, the processing device 120 may process the set of reference image data or the set of image data by performing a Fourier transform or an inverse Fourier transform, so that the set of image data and the set of reference image data may both be image data in a same domain. For example, if the set of reference image data are image data in the image domain and the set of image data are image data in k-space domain, the processing device 120 may perform a Fourier transform on the set of reference image data to obtain a set of processed reference image data. The set of image data and the set of processed reference image data may both be image data in the k-space domain. The processing device 120 may determine a cross-correlation coefficient between the set of processed reference image data and the set of image data using the cross-correlation algorithm. Alternatively, the processing device 120 may perform an inverse Fourier transform on the set of image data to obtain a set of processed image data. The set of processed image data and the set of reference image data may both be image data in the image domain. The processing device 120 may determine a cross-correlation coefficient between the set of reference image data and the set of processed image data using the cross-correlation algorithm.

In some embodiments, the set of reference image data and of the set of image data may include phase information and amplitude information. Merely by way of example, an element value of each element of the set of reference image data and of the set of image data may be represented by a complex number including phase information and amplitude information. For example, an element value of an element may be represented by a complex number (a+i*b), wherein a denotes the real part of the complex number, and b denotes the imaginary part of the complex number, i denotes an imaginary unit. A phase of the element may be represented by $2 \arctan(b/(\sqrt{a^2+b^2}+a))$. An amplitude of the element may be represented by $\sqrt{a^2+b^2}$. As another example, an element value of an element may be represented by a complex number $m*\exp^{(i*\varphi)}$, wherein m denotes an amplitude of the element and $\varphi$ denotes a phase of the element.

In some embodiments, an element of image data in the image domain may be a pixel or a voxel corresponding to a physical point of the subject. An element of image data in the k-space domain may be a k-space domain data point. An element of image data in the k-space domain may include frequency and phase information of all physical points of the subject being imaged. An element of image data in the image domain may include information of all physical points of the subject in the k-space domain. The processing device 120 may determine a first average of element values of the set of reference image data and a second average of element values of the set of image data. In some embodiments, the processing device 120 may determine the first average of element values of the set of reference image data based on the element values and a count of elements of the set of reference image data. For example, the processing device 120 may determine a sum H of element values of the set of reference image data and a count N of elements of the set of reference image data. The processing device 120 may determine $$\frac{H}{N}$$

as the first average. In some embodiments, the second average may be determined in a similar manner as how the first average is determined. The processing device 120 may determine a zero-normalized cross-correlation (ZNCC) using the cross-correlation algorithm based on the element values of the set of reference image data, the element values of the set of image data, the first average, and the second average according to Equation (1):

$$cc = \frac{\sum_{k}^{N}(x_k - \bar{x})(y_k - \bar{y})}{\sqrt{\sum_{k}^{N}|x_k - \bar{x}|^2} \cdot \sqrt{\sum_{k}^{N}|y_k - \bar{y}|^2}}, \quad (1)$$

where cc denotes the ZNCC, N denotes a count of the elements of any one of the set of reference image data (or a portion thereof) or the set of image data (or a portion thereof that corresponds to the portion of the set of reference image data), $x_k$ denotes an element value of the kth element of the set of reference image data, $y_k$ denotes an element value of the kth element of the set of image data, $\bar{x}$ denotes the first average of the element values of the set of reference image data, and $\bar{y}$ denotes the second average of the element values of the set of image data.

In some embodiments, the processing device 120 may designate the ZNCC as the cross-correlation coefficient between the set of reference image data and the set of image data. The cross-correlation coefficient may be in the form of a complex number including phase information and amplitude information.

In some embodiments, the processing device 120 may determine the phase shift between the set of reference image data and the set of image data based on the cross-correlation coefficient. For example, the processing device 120 may designate a value of the cross-correlation coefficient divided by a magnitude of the cross-correlation coefficient as the phase shift between the set of reference image data and the set of image data. The phase shift may be in a form of a complex number. Merely for illustration purposes, if the cross-correlation coefficient is a+i*b, the phase shift in complex form may be $$\frac{a+i*b}{\sqrt{a^2+b^2}},$$

wherein a denotes the real part of the cross-correlation coefficient, b denotes the imaginary part of the cross-correlation coefficient, and i denotes an imaginary unit.

In some embodiments, if the set of reference image data and the plurality of sets of image data of the subject are image data in the k-space domain, the processing device 120 may obtain at least a portion of the set of image data and at least a portion of the set of reference image data corresponding to the at least a portion of the set of image data. The processing device 120 may determine a reference phase shift between the at least a portion of the set of image data and the at least corresponding portion of the set of reference image data using the cross-correlation algorithm. The processing device 120 may designate the reference phase shift as the phase shift between the set of reference image data and the set of image data.

For example, the processing device 120 may obtain a portion of the set of image data in a center region of a k-space and a portion of the set of reference image data corresponding to the portion of the set of image data in a same center region of the k-space. The processing device 120 may determine a reference phase shift between the portion of the set of image data in the center region of the k-space and the corresponding portion of the set of reference image data using the cross-correlation algorithm. Image data in a center region of a k-space may correspond to low spatial frequency information, which may relate to or be used to determine outlines of different organs or types of tissue of the subject in an image and/or a contrast of the image. Image data in a peripheral region of the k-space may correspond to high spatial frequency information, which may relate to or be used to determine edges, details, and sharp transitions of different organs or types of tissue of the subject in the image. In some embodiments, the processing device 120 may designate the reference phase shift as the phase shift between the set of reference image data and the set of image data.

In some embodiments, as described in connection with operation 520, the set of reference image data may be a composite set determined by combining multiple sets of initial or processed image data, an exemplary process of which is provided as follows. For each set of at least some of the plurality of sets of image data, the processing device 120 may determine a phase shift between a set of prior reference image data determined previously and a set of image data of a channel using the cross-correlation algorithm. The processing device 120 may determine a set of corrected image data of the channel by performing a phase correction for the set of image data based on the phase shift between the set of prior reference image data and the set of image data. The processing device 120 may determine a set of current combined image data of the subject by combining the set of corrected image data and the set of prior reference image data determined previously. The processing device 120 may designate the set of current combined image data of the subject as the set of prior reference image data, or the set of final reference image data when all sets of the at least some of the plurality of sets of image data are processed similarly. For each set of the remaining sets of image data among the plurality of sets of image data other than the at least some of the plurality of sets of image data, the processing device 120 may determine a phase shift between the set of final reference image data and the set of image data using the cross-correlation algorithm. In some embodiments, when a phase shift between the set of reference image data (i.e., the set of prior reference image data or the set of final reference image data) and a set of current image data needs to be determined, the processing device 120 may identify, from one or more sets of the plurality of sets of image data that have not been phase corrected, a set of image data with a maximum degree of correlation with the set of reference image data, and designate the set of image data with the maximum degree of correlation as the set of current image data. The processing device 120 may determine the phase shift between the set of reference image data and the set of current image data using the cross-correlation algorithm. In this way, as more sets of corrected image data are obtained, the set of reference image data may be updated based on these more sets of corrected image data, so that the set of reference image data may include more sets of corrected image data. Moreover, each time a set of image data with a maximum degree of correlation with the set of reference image data among the one or more sets of image data that have not been phase corrected, may be identified for processing to determine a phase shift from the set of reference image data for phase correction, thereby improving the accuracy and/or robustness of the phase shift and/or the set of updated reference image data so determined. Target image data of the subject obtained based on the phase shift by performing operations 540 and 550 may be relatively accurate. Thus, the quality of a target image of the subject obtained based on the target image data may be improved. For example, a probability of phase singularity artifacts in a phase image obtained based on the target image data may be relatively low.

In 540, for each set of the plurality of sets of image data, the processing device 120 (e.g., the determination module 420) may obtain, based on the phase shift between the set of reference image data and the set of image data, a set of corrected image data of the channel by performing a phase correction for the set of image data.

In some embodiments, each element of the set of image data may be corrected with respect to the phase shift relative to the set of reference image data by performing a phase correction. In some embodiments, as described in connection with operation 530, the phase shift may be in a form of a complex number, and the processing device 120 may designate an element value of each element of the set of image data divided by the phase shift as a corrected element value of the element. The processing device 120 may obtain the set of corrected image data according to corrected element values of the elements of the set of image data.

In 550, the processing device 120 (e.g., the determination module 420) may determine, based on the plurality of sets of corrected image data of the subject, target image data (also referred to as first target image data) of the subject.

In some embodiments, the processing device 120 may determine a sum of at least some sets of the plurality of sets of corrected image data of the subject as the target image data of the subject. That is, an element value of each element of the target image data may be equal to a sum of the element values of the corresponding elements of the at least some sets of the plurality of sets of corrected image data. As used herein, an element A in a first set of image data is referred to as corresponding to an element B in a second set of image data if both the element A and the element B have a same position in a same domain (e.g., an image domain, or a k space). For example, a pixel C1 in a first set of image data may be referred to as corresponding to a pixel C2 in a second set of image data if both the pixel C1 and the pixel C2 have a same coordinate in a same coordinate system (e.g., a Cartesian coordinate system) in the image domain.

In some embodiments, the processing device 120 may determine a sum of all sets of the plurality of sets of corrected image data of the subject and designate the sum as the target image data of the subject. In some embodiments, the processing device 120 may determine a plurality of target sets of corrected image data of the subject from the plurality of sets of corrected image data based on the phase shifts for obtaining them determined in operation 530. For example, the processing device 120 may identify, from the plurality of sets of corrected image data, a plurality of target sets of corrected image data each of whose phase shift is smaller than a threshold. The processing device 120 may determine a sum of the plurality of target sets of corrected image data of the subject and designate the sum as the target image data of the subject.

In 560, the processing device 120 (e.g., the reconstruction module 430) may reconstruct, based on the target image data of the subject, a target image (also referred to as a first target image) of the subject.

In some embodiments, the target image of the subject may include a target phase image or a target amplitude image of the subject. In some embodiments, the target image data may include phase information and amplitude information. In some embodiments, the processing device 120 may extract phase information of each element of the target image data of the subject. The processing device 120 may reconstruct the target phase image of the subject based on the phase information of the target image data of the subject. In some embodiments, the processing device 120 may extract amplitude information of each element of the target image data of the subject. The processing device 120 may reconstruct the target amplitude image of the subject based on the amplitude information of the target image data of the subject.

In some embodiments, the processing device 120 may reconstruct the target image of the subject using an image reconstruction technique. Exemplary reconstruction techniques may include a 2-dimensional Fourier transform technique, a back projection technique (e.g., a convolution back projection technique, a filtered back projection technique), an iteration technique, etc. Exemplary iteration techniques may include an algebraic reconstruction technique (ART), a simultaneous iterative reconstruction technique (SIRT), a simultaneous algebraic reconstruction technique (SART), an adaptive statistical iterative reconstruction (ASIR) technique, a model-based iterative reconstruction (MBIR) technique, a sinogram affirmed iterative reconstruction (SAFIR) technique, or the like, or any combination thereof.

The phase shifts obtained based on the set of reference image data according to some embodiments of the present disclosure may be relatively accurate and/or robust, thereby improving the quality of the target image data obtained by phase correction based on the phase shifts. The reference image data determined based on a plurality of sets of corrected image data may be relatively more accurate, thereby further improving the accuracy of the obtained target image data. The target image reconstructed based on the accurate target image data may be of high quality, which is beneficial for, e.g., disease diagnosis. For example, a target phase image with a high signal-to-noise ratio (SNR) and few or no phase singularity artifacts may be obtained according to some embodiments of the present disclosure.

It should be noted that the above description regarding the process 500 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

For instance, for MR signals of multiple channels acquired in different scans of same organs or types of tissue of a same subject using a same coil array of the MR scanner, phase shifts of MR signals of multiple channels (or corresponding sets of image data) may be determined once using MR signals acquired in one of the different scans, and applied to phase correction of MR signals of multiple channels acquired in another scan of the different scans. In some embodiments, positions of a same organ or type of tissue of the same subject in different scans may be (substantially) the same. For example, after the subject is positioned within a detection region of the MR scanner, different scans may be performed on the same organ(s) or type(s) of tissue of the subject while the subject remains (substantially) stationary. In some embodiments, the processing device 120 may obtain a plurality of sets of third image data of the subject acquired by the coil array of the MR scanner. Each set of the plurality of sets of third image data may be generated based on a plurality of channels of third MR signals acquired from a channel corresponding to a coil unit of the coil array. In some embodiments, the plurality of channels of third MR signals and the plurality of channels of first MR signals may be generated according to same or different scanning parameters and/or pulse sequences. The processing device 120 may determine a phase shift corresponding to each set of the plurality of sets of image data. For example, as described in connection with operations 520 and 530, for each set of the plurality of sets of image data, the processing device 120 may obtain a phase shift between the set of reference image data and the set of image data using the cross-correlation algorithm. For each set of the plurality of sets of third image data, the processing device 120 may designate a phase shift of a set of image data from a same channel as a phase shift of the set of third image data. The processing device 120 may obtain a set of corrected third image data of the channel by performing a phase correction for the set of third image data based on the phase shift of the set of third image data. In some embodiments, the set of corrected third image data may be obtained in a similar manner as how the set of corrected image data is obtained as described in connection with operation 540. The processing device 120 may determine second target image data of the subject based on the plurality of sets of corrected third image data of the subject. In some embodiments, the second target image data may be determined in a similar manner as how the target image data is determined as described in connection with operation 550. The processing device 120 may further reconstruct a second target image of the subject based on the second target image data of the subject. In some embodiments, the second target image may be reconstructed in a similar manner as how the target image is reconstructed as aforementioned. In this way, phase shifts of the plurality of sets of image data may be used to correct other image data of the subject acquired by the coil array in different scans, thereby improving the efficiency of generating target images based on other image data.

As another example, for MR signals of multiple channels corresponding to different echoes acquired in a same scan using a coil array of the MR scanner, phase shifts of MR signals of the multiple channels (or corresponding sets of image data) may be determined once using MR signals corresponding to one of the different echoes, and applied to phase correction of MR signals of multiple channels corresponding to another of the different echoes.

Merely by way of example, the plurality of sets of image data of the subject described in operation 510 may be generated based on MR signals of different channels corresponding to a first echo. The processing device 120 may obtain a plurality of sets of fourth image data of the subject corresponding to a second echo acquired by the first coil array of the MR scanner. The plurality of sets of image data and the plurality of sets of fourth image data may be acquired in a same scan. The processing device 120 may determine a phase shift corresponding to each set of the plurality of sets of image data. For example, as described in connection with operations 520 and 530, for each set of the plurality of sets of image data, the processing device 120 may determine a phase shift between the set of reference image data and the set of image data using the cross-correlation algorithm. For each set of the plurality of sets of fourth image data, the processing device 120 may designate a phase shift of a set of image data from a same channel as a phase shift of the set of fourth image data. The processing device 120 may obtain a set of corrected fourth image data of the channel by performing a phase correction for the set of fourth image data based on the phase shift of the set of fourth image data. In some embodiments, the set of corrected fourth image data may be obtained in a similar manner as how the set of corrected image data is obtained as described in connection with operation 540. The processing device 120 may determine third target image data of the subject based on the plurality of sets of corrected fourth image data of the subject. In some embodiments, the third target image data may be determined in a similar manner as how the target image data is determined as described in connection with operation 550. The processing device 120 may reconstruct a third target image of the subject corresponding to the second echo based on the third target image data of the subject. In some embodiments, the third target image may be reconstructed in a similar manner as how the target image is reconstructed as aforementioned. In this way, when a plurality of echo images need to be acquired, a phase shift of image data corresponding to one echo may be directly applied in phase correction of other image data corresponding to other echoes in a same scan, thereby improving the efficiency of the generation of the echo images.

EXAMPLES

The following examples are provided for illustration purposes and not intended to be limiting.

Example 1

Figure 6:
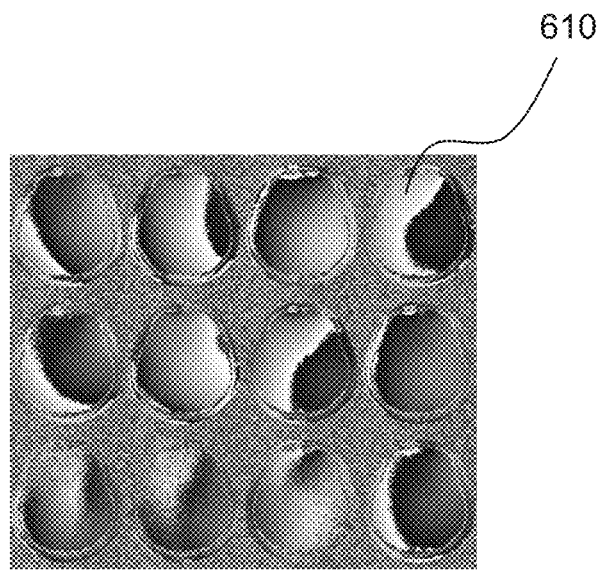
FIG. 6 is a schematic diagram illustrating exemplary MRI phase images of the brain of a subject according to some embodiments of the present disclosure.
Figure 6:
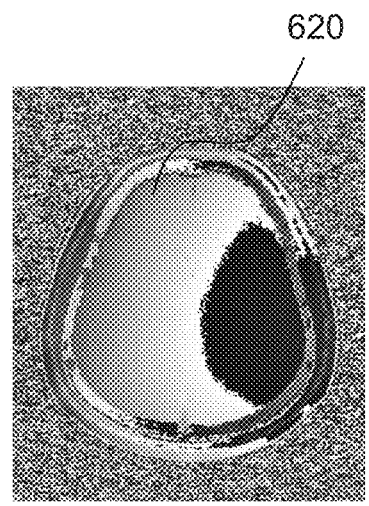
Figure 6:
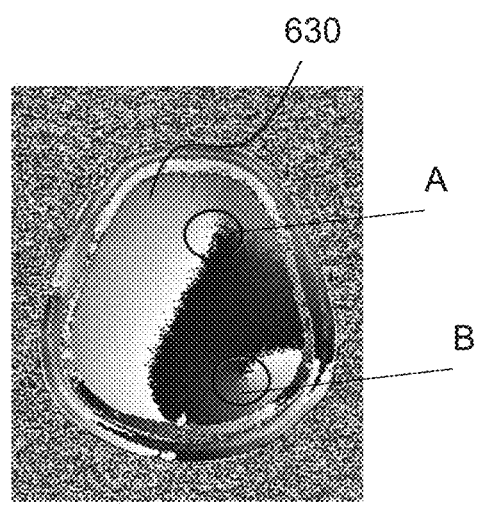

FIG. 6 is a schematic diagram illustrating exemplary MRI phase images of the brain of a subject according to some embodiments of the present disclosure. As shown in FIG. 6, multiple MRI phase images 610 of the brain of the subject were generated based on multiple sets of image data acquired in a same scan of the brain of the subject. Each of the multiple MRI phase image 610 was generated based on one set of the multiple sets of image data. An MRI phase image 620 of the brain of the subject was generated based on target image data obtained by performing phase correction of the multiple sets of image data based on the multiple sets of image data according to some embodiments of the present disclosure. An MRI phase image 630 of the brain of the subject was generated based on image data obtained by directly summing the multiple sets of image data. As illustrated in FIG. 6, phase singularity artifacts appear in a region A and a region B in the MRI phase image 630. However, no phase singularity artifacts appear in the MRI phase image 620.

Example 2

The processing device 120 obtains a plurality of sets of image data of a subject acquired by an MR scanner. More descriptions for obtaining of the plurality of sets of image data may be found elsewhere in the present disclosure. See, e.g., operation 510 in FIG. 5 and relevant descriptions thereof. Then, the processing device 120 obtains a set of reference image data of the subject from the plurality of sets of image data. For example, the processing device 120 designates a set of image data with a maximum signal strength as the set of reference image data of the subject from the plurality of sets of image data. As another example, the processing device 120 obtains a degree of correlation between each two sets of image data of the plurality of sets of image data using a cross-correlation algorithm. The processing device 120 identifies a maximum degree of correlation among the degrees of correlation. Then, the processing device 120 identifies a first set of image data and a second set of image data corresponding to the maximum of the degree of correlations. Further, the processing device 120 designates the first set of image data as the set of reference image data of the subject whose signal strength is greater than a signal strength of the second set of image data. For each set of the plurality of sets of image data, the processing device 120 determines a phase shift between the set of reference image data and the set of image data using the cross-correlation algorithm. Further, for each set of the plurality of sets of image data, the processing device 120 obtains a set of corrected image data of the channel by performing a phase correction for the set of image data based on the phase shift between the set of reference image data and the set of image data. In each iteration of an iterative process, the processing device 120 identifies, from one or more sets of the plurality of sets of image data that have not been phase corrected, a set of image data with a maximum degree of correlation with the set of reference image data, and designate the set of image data with the maximum degree of correlation as the set of current image data; and the processing device 120 determines the phase shift between the set of reference image data and the set of current image data using the cross-correlation algorithm. Alternatively, in the iterative process, the processing device 120 retrieves, from one or more sets of the plurality of sets of image data that have not been phase corrected, a set of image data for determining a phase shift from the set of reference image data, without considering or ranking its degree of correlation with the set of reference image data among the one or more sets of image data that have not been phase corrected. Through the iterative process, the processing device 120 may determine phase shifts between the plurality of sets of image data and the set of reference image data, and phase correct the plurality of sets of image data based on their respective phase shifts. Then, the processing device 120 determines target image data of the subject based on the plurality of sets of corrected image data of the subject. Finally, the processing device 120 reconstruct, a target image of the subject based on the target image data of the subject. More descriptions for determination of the phase shift, the set of corrected image data, the target image data, and the target image may be found elsewhere in the present disclosure. See, e.g., operations 530-560 in FIG. 5 and relevant descriptions thereof.

Example 3

The processing device 120 obtains a plurality of sets of image data of a subject acquired by an MR scanner. More descriptions for obtaining of the plurality of sets of image data may be found elsewhere in the present disclosure. See, e.g., operation 510 in FIG. 5 and relevant descriptions thereof. Then, the processing device 120 obtains a set of reference image data of the subject based on the plurality of sets of image data. The set of reference image data may be a composite set determined by combining multiple sets of processed image data, an exemplary process of which is provided as follows. For each set of the plurality of sets of image data, the processing device 120 determines a phase shift between a set of prior reference image data determined previously and the set of image data using a cross-correlation algorithm. The processing device 120 also determines a set of corrected image data of the channel by performing a phase correction for the set of image data based on the phase shift between the set of prior reference image data and the set of image data. The processing device 120 also determines a set of current combined image data of the subject by combining the set of corrected image data and the set of prior reference image data determined previously. The processing device 120 further designates the set of current combined image data of the subject as the set of prior reference image data. In some embodiments, a set of initial reference image data (i.e., a set of reference image data obtained for the first time) of the subject may be obtained from the plurality of sets of image data in a similar manner as described in Example 2. In each iteration of an iterative process, the processing device 120 identifies, from one or more sets of the plurality of sets of image data that have not been phase corrected, a set of image data with a maximum degree of correlation with the set of reference image data, and designate the set of image data with the maximum degree of correlation as the set of current image data; and the processing device 120 determines the phase shift between the set of reference image data and the set of current image data using the cross-correlation algorithm. Alternatively, in the iterative process, the processing device 120 retrieves, from one or more sets of the plurality of sets of image data that have not been phase corrected, a set of image data for determining a phase shift from the set of reference image data, without considering or ranking its degree of correlation with the set of reference image data among the one or more sets of image data that have not been phase corrected. Through the iterative process, the processing device 120 may determine phase shifts between the plurality of sets of image data and the set of reference image data, and phase correct the plurality of sets of image data based on their respective phase shifts. Then, the processing device 120 determines target image data of the subject based on the plurality of sets of corrected image data of the subject. Finally, the processing device 120 reconstruct a target image of the subject based on the target image data of the subject. More descriptions for determination of the phase shift, the set of corrected image data, the target image data, and the target image may be found elsewhere in the present disclosure. See, e.g., operations 530-560 in FIG. 5 and relevant descriptions thereof.

Example 4

The processing device 120 obtains a plurality of sets of image data of a subject acquired by an MR scanner. More descriptions for obtaining of the plurality of sets of image data may be found elsewhere in the present disclosure. See, e.g., operation 510 in FIG. 5 and relevant descriptions thereof. Then, the processing device 120 determines a set of reference image data of the subject based on the plurality of sets of image data by combining at least two sets of processed image data. For example, the processing device 120 obtains a set of initial reference image data of the subject from the plurality of sets of image data. For each set of at least one set of the plurality of sets of image data, the processing device 120 determines a phase shift between the set of initial reference image data and the set of image data using a cross-correlation algorithm. The processing device 120 also obtains a set of corrected initial image data by performing a phase correction for the set of image data based on the phase shift between the set of initial reference image data and the set of image data. The processing device 120 further determines the set of reference image data of the subject based on the at least one set of corrected initial image data. More descriptions for determination of the set of reference image data based on the plurality of sets of image data by combining at least two sets of processed image data may be found elsewhere in the present disclosure. See, e.g., operation 520 in FIG. 5 and relevant descriptions thereof. For each set of the plurality of sets of image data, the processing device 120 also determines a phase shift between the set of reference image data and the set of image data using the cross-correlation algorithm. Further, for each set of the plurality of sets of image data, the processing device 120 obtains a set of corrected image data of the channel by performing a phase correction for the set of image data based on the phase shift between the set of reference image data and the set of image data. In each iteration of an iterative process, the processing device 120 identifies, from one or more sets of the plurality of sets of image data that have not been phase corrected, a set of image data with a maximum degree of correlation with the set of reference image data, and designate the set of image data with the maximum degree of correlation as the set of current image data; and the processing device 120 determines the phase shift between the set of reference image data and the set of current image data using the cross-correlation algorithm. Alternatively, in the iterative process, the processing device 120 retrieves, from one or more sets of the plurality of sets of image data that have not been phase corrected, a set of image data for determining a phase shift from the set of reference image data, without considering or ranking its degree of correlation with the set of reference image data among the one or more sets of image data that have not been phase corrected. Through the iterative process, the processing device 120 may determine phase shifts between the plurality of sets of image data and the set of reference image data, and phase correct the plurality of sets of image data based on their respective phase shifts. Then, the processing device 120 determines target image data of the subject based on the plurality of sets of corrected image data of the subject. Finally, the processing device 120 reconstruct a target image of the subject based on the target image data of the subject. More descriptions for determination of the phase shift, the set of corrected image data, the target image data, and the target image may be found elsewhere in the present disclosure. See, e.g., operations 530-560 in FIG. 5 and relevant descriptions thereof.

Example 5

The processing device 120 obtains a plurality of sets of image data of a subject acquired by an MR scanner. More descriptions for obtaining of the plurality of sets of image data may be found elsewhere in the present disclosure. See, e.g., operation 510 in FIG. 5 and relevant descriptions thereof. Then, the processing device 120 determines a set of reference image data of the subject based on image data that are different from the plurality of sets of image data used to generate a target image. For instance, the image data used to determine the set of reference image data may be determined based on MR signals acquired in another scanning using a coil array that is the same as or different from the coil array for acquiring the plurality of sets of image data used to determine the target image. More descriptions for determination of the set of reference image data based on image data that are different from the plurality of sets of image data used to generate a target image may be found elsewhere in the present disclosure. See, e.g., operation 520 in FIG. 5 and relevant descriptions thereof. For each set of the plurality of sets of image data, the processing device 120 also determines a phase shift between the set of reference image data and the set of image data using the cross-correlation algorithm. Further, for each set of the plurality of sets of image data, the processing device 120 obtains a set of corrected image data of the channel by performing a phase correction for the set of image data based on the phase shift between the set of reference image data and the set of image data. In each iteration of an iterative process, the processing device 120 identifies, from one or more sets of the plurality of sets of image data that have not been phase corrected, a set of image data with a maximum degree of correlation with the set of reference image data, and designate the set of image data with the maximum degree of correlation as the set of current image data; and the processing device 120 determines the phase shift between the set of reference image data and the set of current image data using the cross-correlation algorithm. Alternatively, in the iterative process, the processing device 120 retrieves, from one or more sets of the plurality of sets of image data that have not been phase corrected, a set of image data for determining a phase shift from the set of reference image data, without considering or ranking its degree of correlation with the set of reference image data among the one or more sets of image data that have not been phase corrected. Through the iterative process, the processing device 120 may determine phase shifts between the plurality of sets of image data and the set of reference image data, and phase correct the plurality of sets of image data based on their respective phase shifts. Then, the processing device 120 determines target image data of the subject based on the plurality of sets of corrected image data of the subject. Finally, the processing device 120 reconstruct a target image of the subject based on the target image data of the subject. More descriptions for determination of the phase shift, the set of corrected image data, the target image data, and the target image may be found elsewhere in the present disclosure. See, e.g., operations 530-560 in FIG. 5 and relevant descriptions thereof.

It will be apparent to those skilled in the art that various changes and modifications can be made in the present disclosure without departing from the spirit and scope of the disclosure. In this manner, the present disclosure may be intended to include such modifications and variations if the modifications and variations of the present disclosure are within the scope of the appended claims and the equivalents thereof.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate a certain variation (e.g., ±1%, ±5%, ±10%, or ±20%) of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable. In some embodiments, a classification condition used in classification or determination is provided for illustration purposes and modified according to different situations. For example, a classification condition that "a value is greater than the threshold value" may further include or exclude a condition that "the probability value is equal to the threshold value."

What is claimed is:

1. A system, comprising:
   at least one storage device including a set of instructions; and
   at least one processor in communication with the at least one storage device, wherein when executing the set of instructions, the at least one processor is directed to cause the system to perform operations including:
      obtaining a plurality of sets of image data of a subject acquired by a magnetic resonance (MR) scanner, each set of the plurality of sets of image data being acquired from a channel corresponding to a coil unit of a coil array of the MR scanner;
      obtaining a set of reference image data of the subject;
      for each set of the plurality of sets of image data,
         determining a phase shift between the set of reference image data and the set of image data using a cross-correlation algorithm, including:
            determining a cross-correlation coefficient between the set of reference image data and the set of image data using the cross-correlation algorithm; and
            designating a value of the cross-correlation coefficient divided by a magnitude of the cross-correlation coefficient as the phase shift between the set of reference image data and the set of image data; and
         obtaining, based on the phase shift, a set of corrected image data of the channel by performing a phase correction for the set of image data;
      determining, based on a plurality of sets of corrected image data of
      the subject, target image data of the subject; and
      reconstructing, based on the target image data of the subject, a target image of the subject.

2. The system of claim 1, wherein the set of reference image data and the plurality of sets of image data of the subject include image data in an image domain, image data in a k-space domain, or image data in an image and k-space hybrid domain.

3. The system of claim 1, wherein the determining the set of reference image data of the subject further includes:
   designating, from the plurality of sets of image data, a set of image data with a maximum signal strength as the set of reference image data of the subject.

4. The system of claim 1, wherein the determining the set of reference image data of the subject further includes:
   obtaining a set of initial reference image data of the subject;
   for each set of at least one set of the plurality of sets of image data,
      determining a phase shift between the set of initial reference image data and the set of image data using the cross-correlation algorithm; and
      obtaining, based on the phase shift between the set of initial reference image data and the set of image data, a set of corrected initial image data by performing a phase correction for the set of image data; and
   determining, based on the at least one set of corrected initial image data, the set of reference image data of the subject.

5. The system of claim 1, wherein the at least one processor is further directed to cause the system to perform the operations including:
for each set of at least some of the plurality of sets of image data, determining a sum of the set of corrected image data and a set of prior reference image data determined previously as the set of reference image data of the subject.

6. The system of claim 1, wherein the obtaining a set of reference image data of the subject includes:
obtaining a plurality of second sets of image data of the subject acquired by a second coil array of the MR scanner, each set of the plurality of second sets of image data being acquired from a second channel corresponding to a second coil unit of the second coil array; and
determining, based on the plurality of second sets of image data, the set of reference image data of the subject.

7. The system of claim 6, wherein the determining, based on the plurality of second sets of image data, the set of reference image data of the subject includes:
obtaining a set of initial reference image data of the subject;
for each set of the plurality of second sets of image data, determining a phase shift between the set of initial reference image data and the second set of image data using the cross-correlation algorithm; and
obtaining, based on the phase shift between the set of initial reference image data and the second set of image data, a second set of corrected image data of the second channel by performing a phase correction for the second set of image data; and
determining, based on the plurality of second sets of corrected image data, the reference image data of the subject.

8. The system of claim 1, wherein the obtaining a set of reference image data of the subject includes:
obtaining a plurality of sets of second image data of the subject acquired by the coil array of the MR scanner, each set of the plurality of sets of second image data being acquired from a channel corresponding to a coil unit of the coil array; and
determining, based on the plurality of sets of second image data, the set of reference image data of the subject.

9. The system of claim 8, wherein the determining, based on the plurality of sets of second image data, the set of reference image data of the subject includes:
obtaining a set of initial reference image data of the subject;
for each set of the plurality of sets of second image data, determining a phase shift between the initial reference image data and the set of second image data using the cross-correlation algorithm; and
obtaining, based on the phase shift between the initial reference image data and the set of second image data, a set of corrected second image data of the channel by performing a phase correction for the set of second image data; and
determining, based on the plurality of sets of corrected second image data, the reference image data of the subject.

10. The system of claim 1, wherein the target image of the subject includes a target phase image or a target amplitude image of the subject.

11. The system of claim 1, wherein the at least one processor is further directed to cause the system to perform the operations including:
obtaining a plurality of sets of second image data of the subject acquired by the coil array of the MR scanner, each set of the plurality of sets of second image data being acquired from a channel corresponding to a coil unit of the coil array;
for each set of the plurality of sets of second image data, designating a phase shift of a set of image data from a same channel as a phase shift of the set of second image data; and
obtaining, based on the phase shift of the set of second image data, a set of corrected second image data of the channel by performing a phase correction for the set of second image data;
determining, based on the plurality of sets of corrected second image data of the subject, second target image data of the subject; and
reconstructing, based on the second target image data of the subject, a second target image of the subject.

12. The system of claim 1, wherein the plurality of sets of image data of the subject corresponds to a first echo, and the at least one processor is further directed to cause the system to perform the operations including:
obtaining a plurality of sets of second image data of the subject corresponding to a second echo acquired by the coil array of the MR scanner, the plurality of sets of image data and the plurality of sets of second image data being acquired in a same scan;
for each set of the plurality of sets of second image data, designating a phase shift of a set of image data from a same channel as a phase shift of the set of second image data; and
obtaining, based on the phase shift of the set of second image data, a set of corrected second image data of the channel by performing a phase correction for the set of second image data;
determining, based on the plurality of sets of corrected second image data of the subject, second target image data of the subject; and
reconstructing, based on the second target image data of the subject, a second target image of the subject corresponding to the second echo.

13. The system of claim 1, wherein the obtaining, based on the phase shift, a set of corrected image data of the channel by performing a phase correction for the set of image data includes:
dividing an element value of each element of the set of image data by the phase shift;
designating the element value of each element of the set of image data divided by the phase shift as a corrected element value of the element; and
obtaining the set of corrected image data according to corrected element values of the elements of the set of image data.

14. The system of claim 1, wherein the set of reference image data of the subject is a weighted sum of the plurality of sets of image data, and a weight of each set of the plurality of sets of image data is determined according to a coil sensitivity of each coil unit of the coil array.

15. The system of claim 1, wherein an element value of each element of the set of reference image data and of the set of image data is represented by a complex number including phase information and amplitude information, and the determining a cross-correlation coefficient between the set of reference image data and the set of image data using the cross-correlation algorithm including:
  determining a first average of element values of the set of reference image data and a second average of element values of the set of image data;
  determining, based on the element values of the set of reference image data, the element values of the set of image data, the first average, and the second average, a zero-normalized cross-correlation (ZNCC) using the cross-correlation algorithm; and
  designating the ZNCC as the cross-correlation coefficient between the set of reference image data and the set of image data, the cross-correlation coefficient being in a form of a complex number including phase information and amplitude information.

16. The system of claim 1, wherein the set of reference image data and the plurality of sets of image data of the subject are image data in a k-space domain, and the determining a phase shift between the set of reference image data and the set of image data using the cross-correlation algorithm includes:
  obtaining at least a portion of the set of image data;
  obtaining at least a portion of the set of reference image data corresponding to the at least a portion of the set of image data;
  determining a reference phase shift between the at least a portion of the set of image data and the at least corresponding portion of the set of reference image data using the cross-correlation algorithm; and
  designating the reference phase shift as the phase shift between the set of reference image data and the set of image data.

17. A method, the method being implemented on a computing device having at least one storage device and at least one processor, the method comprising:
  obtaining a plurality of sets of image data of a subject acquired by a magnetic resonance (MR) scanner, each set of the plurality of sets of image data being acquired from a channel corresponding to a coil unit of a coil array of the MR scanner;
  obtaining a set of reference image data of the subject;
  for each set of the plurality of sets of image data,
    determining a phase shift between the set of reference image data and the set of image data using a cross-correlation algorithm, including:
      determining a cross-correlation coefficient between the set of reference image data and the set of image data using the cross-correlation algorithm; and
      designating a value of the cross-correlation coefficient divided by a magnitude of the cross-correlation coefficient as the phase shift between the set of reference image data and the set of image data; and
    obtaining, based on the phase shift, a set of corrected image data of the channel by performing a phase correction for the set of image data;
  determining, based on a plurality of sets of corrected image data of the subject, target image data of the subject; and
  reconstructing, based on the target image data of the subject, a target image of the subject.

18. A non-transitory computer readable medium, comprising at least one set of instructions, wherein when executed by at least one processor of a computing device, the at least one set of instructions causes the computing device to perform a method, the method comprising:
  obtaining a plurality of sets of image data of a subject acquired by a magnetic resonance (MR) scanner, each set of the plurality of sets of image data being acquired from a channel corresponding to a coil unit of a coil array of the MR scanner;
  obtaining a set of reference image data of the subject;
  for each set of the plurality of sets of image data,
    determining a phase shift between the set of reference image data and the set of image data using a cross-correlation algorithm, including:
      determining a cross-correlation coefficient between the set of reference image data and the set of image data using the cross-correlation algorithm; and
      designating a value of the cross-correlation coefficient divided by a magnitude of the cross-correlation coefficient as the phase shift between the set of reference image data and the set of image data; and
    obtaining, based on the phase shift, a set of corrected image data of the channel by performing a phase correction for the set of image data;
  determining, based on a plurality of sets of corrected image data of the subject, target image data of the subject; and
  reconstructing, based on the target image data of the subject, a target image of the subject.

* * * * *